(12) United States Patent
Brown et al.

(10) Patent No.: US 9,519,422 B2
(45) Date of Patent: *Dec. 13, 2016

(54) GRAPHICAL USER INTERFACE

(71) Applicants: Wendell D. Brown, Henderson, NV (US); Daniel E. Vaughan, Davis, CA (US)

(72) Inventors: Wendell D. Brown, Henderson, NV (US); Daniel E. Vaughan, Davis, CA (US)

(73) Assignee: Wendell D. Brown, Henderson, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/217,609

(22) Filed: Jul. 22, 2016

(65) Prior Publication Data

US 2016/0328113 A1 Nov. 10, 2016

Related U.S. Application Data

(63) Continuation of application No. 14/933,998, filed on Nov. 5, 2015, now Pat. No. 9,417,785, which is a continuation of application No. 13/113,734, filed on May 23, 2011, now Pat. No. 9,223,461.

(60) Provisional application No. 61/420,985, filed on Dec. 8, 2010.

(51) Int. Cl.
| G06F 3/0481 | (2013.01) |
| G06F 3/0488 | (2013.01) |
| G06F 17/22 | (2006.01) |
| G06F 3/0482 | (2013.01) |

(Continued)

(52) U.S. Cl.
CPC .......... *G06F 3/0488* (2013.01); *G06F 3/0482* (2013.01); *G06F 3/0485* (2013.01); *G06F 17/2241* (2013.01); *H04W 88/02* (2013.01)

(58) Field of Classification Search
None
See application file for complete search history.

(56) References Cited

U.S. PATENT DOCUMENTS 6,874,126 B1 * 3/2005 Lapidous .............. G06F 3/0481
715/711
7,554,530 B2 * 6/2009 Mizobuchi .......... G06F 3/04883
345/156

(Continued)

*Primary Examiner* — Phenuel Salomon
(74) *Attorney, Agent, or Firm* — Park, Vaughan, Fleming & Dowler LLP

(57) ABSTRACT

A graphical user interface is provided for navigating and/or manipulating content simply via touch of a touch-sensitive surface. The content may include discrete content items (e.g., songs, video clips, documents, web pages) and/or actions (e.g., place a call, read a message, play a game), and may or may not be hierarchical in nature. The interface may be presented on a touch-screen display, such that a user may navigate to a content item or action via a single touch on the display (e.g., with a finger or other tool), followed by gliding through any number of levels or clusters of nodes (representing content items, content compilations/categories and/or actions). The desired content item or action may be initiated automatically (e.g., opened, performed) simply by touching it, by lifting the gliding finger or by performing some other input (e.g., tapping a node, speaking a command, touching with a second finger).

24 Claims, 18 Drawing Sheets

(51) Int. Cl.
  *G06F 3/0485* (2013.01)
  *H04W 88/02* (2009.01)

(56) References Cited

U.S. PATENT DOCUMENTS

| | | | |
|---|---|---|---|
| 7,663,605 B2* | 2/2010 | Fitzmaurice | G06F 3/0481 345/173 |
| 7,810,048 B2* | 10/2010 | Lee | G06F 17/30994 715/817 |
| 8,103,296 B2* | 1/2012 | Kim | G06F 3/0485 455/466 |
| 8,332,763 B2* | 12/2012 | Zhang | G06F 17/30893 715/255 |
| 8,477,112 B2* | 7/2013 | Lee | G06F 3/0482 345/173 |
| 2005/0027712 A1* | 2/2005 | Gargi | G06F 17/30274 |
| 2005/0171853 A1* | 8/2005 | Fettig | G06Q 20/20 705/22 |
| 2006/0156247 A1* | 7/2006 | McCormack | G06F 3/0481 715/767 |
| 2006/0248455 A1* | 11/2006 | Weise | G06F 3/0482 715/201 |
| 2008/0097961 A1* | 4/2008 | Dias | G06F 11/3414 |
| 2008/0229209 A1* | 9/2008 | Matsuzaki | H04N 5/4403 715/740 |
| 2009/0019371 A1 | 1/2009 | Audet | |
| 2009/0193348 A1* | 7/2009 | Banks | G06F 3/04883 715/764 |
| 2010/0085318 A1 | 4/2010 | Lee et al. | |
| 2010/0175032 A1* | 7/2010 | Ishiwata | G06F 3/0482 715/853 |
| 2010/0287512 A1* | 11/2010 | Gan | G06F 17/30994 715/854 |
| 2011/0016390 A1* | 1/2011 | Oh | G06F 3/0482 715/702 |
| 2013/0285964 A1* | 10/2013 | Kang | G06F 3/044 345/173 |

* cited by examiner

GRAPHICAL USER INTERFACE

RELATED ART

This application is a continuation of co-pending U.S. patent application Ser. No. 14/933,998, filed Nov. 5, 2015. The '998 application is a continuation of U.S. patent application Ser. No. 13/113,734, filed May 23, 2011 and issued Dec. 29, 2015 as U.S. Pat. No. 9,223,461. The preceding application and patent claim priority to U.S. Provisional Application No. 61/420,985, which was filed Dec. 8, 2010 and is incorporated herein by reference.

BACKGROUND

This invention relates to the fields of computers and communication devices. More particularly, a graphical user interface, methods and apparatus are provided for navigating electronically stored information on a computing or communication device.

Traditional browsing methods generally involve repeatedly clicking on links (e.g., hyperlinks) to view different frames or pages of electronic content. Each time a link is selected, a different set of content is presented that usually completely replaces the previous set of content.

Thus, navigating to a selected page of content generally changes the user's entire context, in that he or she may now view only the new content and not previously selected content or other content that the user may have been able to select. Therefore, to find a specific page or item of content, the user may need to navigate through multiple links, and/or reverse one or more selections to take different paths, until the desired page or item is located.

Further, each selection of a link by a user of a computer system may involve actions such as moving his hand to a mouse or other pointing device, guiding a cursor controlled by the pointing device to the link, and clicking a mouse button. On a smartphone, personal digital assistant (PDA) or other communication device, activating each link in a series of links may involve scrolling a page of content (to display the link) and tapping on the link with a finger or other tool.

Existing methods of navigation of electronic content may therefore require continuous three-dimensional spatial awareness on the part of a user, in that he must guide his hand, stylus or other instrument through three-dimensional space (i.e., the air) each time a new selection is to be made.

Consequently, navigating a hierarchical collection of electronic content via traditional browsing can involve multiple user actions, may be tedious (if a large number of links must be activated), and may be difficult if the user is multitasking (e.g., walking and browsing). If a wrong path link is selected, navigation may need to be restarted or traced backward in order to select the correct path.

A hierarchical collection of content may comprise content (e.g., text, video, images, applications, application data) that is organized into multiple levels and/or categories. As examples, a user's music collection may be divided by genre (e.g., rock, pop, country), artist, year of release and/or other criteria; contacts may be divided by name, category (e.g., friend, family, workmates) or how recently they were used; documents may be divided into an endless number and level of categories according to nature or purpose, age, creator, title, etc.

In short, the more action that must be taken to make a content selection with traditional browsing systems, methods and interfaces, the more action that must be repeated to navigate through a collection of content and the more likely it is that a wrong link or content item may be selected. In some environments, such as when a user is comfortably seated at a desktop computer system, such repetition may not be troublesome. But, for a user of a smartphone, tablet or other mobile communication or computing device, such repetition may be annoying and frustrating.

SUMMARY

In some embodiments of the invention, an apparatus, method and/or interface are provided for easily and quickly navigating content on a computing or communication device having a touch-screen display. In these embodiments, "content" may include data (e.g., music, documents, contacts) and/or applications (e.g., an address book selector, a word processor, electronic mail, a social networking interface) accessible on or via the device comprising the display. Other embodiments may be configured for use without a touch-screen display.

In some embodiments, a user employs a finger (or a tool such as a wand or touchpad) to trace, on the touch-screen display, a path through a graphical representation of the content. Illustratively, individual content items and/or collections of content may be represented by nodes or shapes displayed on the touch-screen.

Content may be presented hierarchically, meaning that a node corresponding to a target content item may be reached by navigating through one or more levels of other nodes representing types of content or collections of content that logically encompass the target item.

In some embodiments, nodes representing content items and collections of content items may be presented around the current location of the user's finger (or other tool), may be arrayed in an arc or semi-circle around that position, or may be arranged in virtually any other manner. By simply tracing her finger through the nodes, she may easily and quickly reach her desired content.

In some embodiments, measures may be taken to conserve space on the screen, to disambiguate nodes, to disambiguate tracks between nodes or to take other action to facilitate the user's navigation. For example, one or more nodes that are relatively close to the current location of the user's finger may be magnified and/or expanded (e.g., to show more information, to show content or nodes that are accessible from that node). Or, a region of the display relatively remote from the user's current location may shrink.

In some embodiments of the invention, a track to a given node may comprise a "commit point"; when the user reaches a commit point, it may be assumed that she is selecting the corresponding node. Yet further, the display may be automatically or manually scrolled, presentation of nodes the user may select may be biased away from an edge or boundary of the display, nodes corresponding to more frequently accessed content may be presented more prominently or in more easily reached locations, etc.

User inputs may include touching the display with a first, second or other finger, dragging a finger, tapping on the screen, shaking or turning the device, speaking, and so on, and may initiate various action.

Thus, in embodiments of the invention provided herein, a user may access desired content and/or initiate a desired action by simply sliding or gliding a finger along the surface of his communication device. As his or her finger glides, clusters of selectable objects are presented, representing content he or she may desire to access or activate.

DETAILED DESCRIPTION

Figure 1:
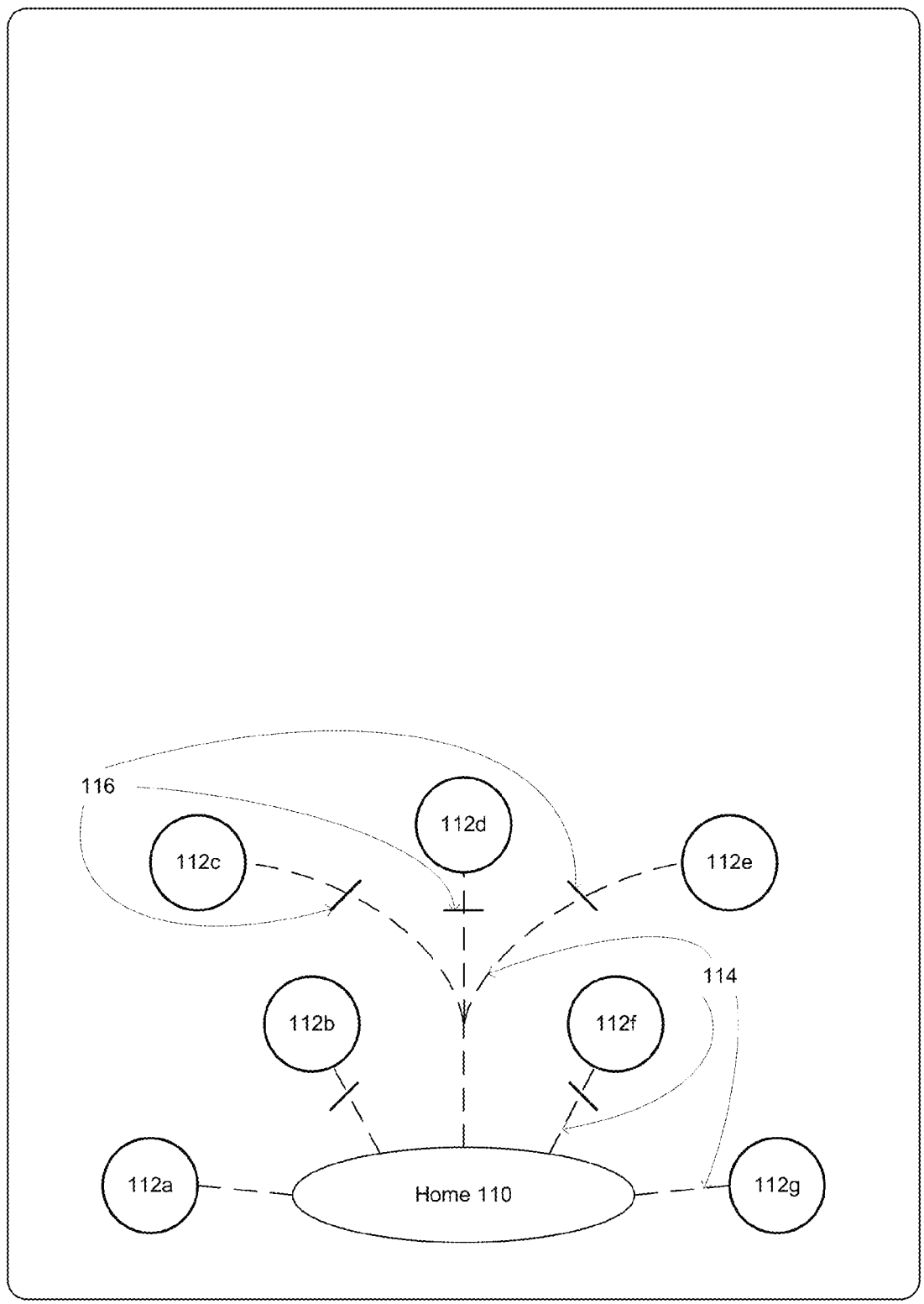
FIG. 1 is a view of a graphical user interface (GUI) according to some embodiments of the present invention.

The following description is presented to enable any person skilled in the art to make and use the invention, and is provided in the context of one or more particular applications and their requirements. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In some embodiments of the invention, an apparatus, method and/or graphical user interface (GUI) are provided for facilitating a user's access or navigation to or through electronic content. In these embodiments, the user glides his or her finger (or other tool) toward and/or through nodes displayed on a touch-screen display. The user may be able to open, play or otherwise access or manipulate content by simply touching the display and tracing a path to a node corresponding to the desired content. Other embodiments of the invention may be implemented without a touch-screen display, in which case a mouse, trackpad, keyboard or other input device is used to control navigation. In some implementations, input may be by voice or by motion other than finger movement on a touch-screen display, such as movement of the body or a body part as sensed by Microsoft® Kinect or Sony® Move.

A given node displayed in the GUI may correspond to a discrete content item (e.g., a document, a song, a contact, a web page, a news story, an application, a script, a utility) or a category, folder or other physical or logical aggregation of multiple content items or of sub-aggregations. Content that a user navigates or accesses may include hierarchically organized content and/or discrete content items that are not hierarchically arranged. Illustratively, the nodes may be displayed in a tree or network structure, which may grow as the user navigates.

When a particular node within a level of nodes is selected (e.g., touched) or approached, one or more nodes within a subsequent level of nodes may be displayed, perhaps corresponding to content items or categories subsumed within, or encompassed by, the content corresponding to the selected node. Therefore, by navigating to/through a particular node, the user may be able to reach additional nodes representing content encompassed by the particular node.

Alternatively, any number of clusters or levels of nodes may be displayed simultaneously. Thus, from a current node (e.g., a node the user has most recently selected), any number of other nodes may be visible, even some that are reachable only through one or more intermediate nodes.

In some embodiments of the invention, selecting a node may require touching it. In other embodiments, movement toward a node may be sufficient. For example, movement of a user's finger (or other tool) a threshold percentage of the distance from a current node to another node may be sufficient to select that node or to trigger other action described below (e.g., magnification, a display of additional information regarding the other node or its associated content).

In addition, the user's gliding movement may be in any direction at any time, according to where nodes are displayed. Navigation may therefore begin at any location on the display component, and may visit or re-visit any portion of the display.

Different nodes displayed in a GUI described herein may be identical or may differ in size, shape, color, brightness, font, line thickness and/or other characteristics. Such characteristics may be used to differentiate different types of contents, availability of content, content location (e.g., local device, a remote server), content source (e.g., publisher, artist) or other trait.

Content navigated or manipulated as described herein may include information of any type (e.g., text, audio, video, multimedia, executable), in any form, such as documents, images, video clips, songs, movies, etc. Content may also include applications or other functionality of the device or system comprising the screen.

Thus, not only can embodiments of the invention described herein be used to navigate to and access a desired piece of content, such as a news story or image, they may also be used to take actions such as place a call, buy a concert ticket, obtain directions, take a picture, etc.

In some embodiments of the invention described herein, "current node" refers to the node most recently selected by a user—either explicitly or implicitly. A current node may also be adopted by default, such as when a GUI is first opened and a "home" or "default" area or node serves as the initial current node. And, as described herein, a user may not need to actually touch a node to select it. The current node may or may not be visible; for example, it may shrink or disappear after being selected so as to save screen space.

A "current cluster" (or set or level) of nodes refers to a cluster of nodes that are directly selectable from the current node, by gliding the user's finger over the touch-screen display, without having to pass through any other nodes.

Thus, the current cluster of nodes may change each time the user selects a new current node.

Any number of clusters of nodes may be presented in a GUI view, but only those directly reachable from the current node are in the current cluster. In some implementations, a user may be able to select any displayed node (in any cluster or level of nodes) to activate it (i.e., to access the corresponding content), not only those in the current cluster.

A cursor, pointer or other indicator of a current location of navigation may or may not be displayed. For example, when navigation is via a user's finger, no other indicator may be needed. However, when navigation is via a touchpad, mouse or other input component, an indicator may be helpful.

FIG. 1 depicts a Graphical User Interface (GUI) for navigating electronic content, according to some embodiments of the invention. In these embodiments, touch-screen display 102 may comprise a display component of a tablet computer, a smartphone, a personal digital assistant (PDA), a laptop or notebook computer, or some other type of computer or communication device. In other embodiments of the invention, however, a GUI may be provided for use on a display component that is not a touch-screen, in which case a cursor or other pointer for navigating the GUI may be guided with a mouse, touchpad or other input device.

In FIG. 1, home area 110 is an exemplary starting area and may therefore serve as the initial current node of navigation. Illustratively, the user may initiate navigation by placing a finger within or near home area 110.

In some embodiments, a user may be able to initiate navigation by touching any portion of the display, not just a specified area such as home area 110, and the first cluster of nodes may be dynamically positioned in proximity to where the display is first touched. Home area 110 may be displayed when the user activates a particular mode of operation of the device (e.g., to access content, to take some action), or manipulates the device or a control (e.g., button), or may be displayed by default when the device is not otherwise in use (e.g., on a call, displaying content, in power-saving mode).

References to a user's finger as a navigation tool should be understood to also contemplate use of virtually any other input method or tool (e.g., a wand, audio command, movement or reorientation of the entire device), with or without a touch-screen display. Operation of the GUI may even use multiple inputs, such as voice command and finger movement.

Other methods of input/navigation may include tilting or jerking the device in a particular direction. In response to such an action, a pointer, cursor or other marker showing a current position within the GUI will glide accordingly (e.g., in the same direction). The latter methods may be limited to devices that include accelerometers or comparable components.

In the GUI of FIG. 1, a first cluster or level of nodes 112 is arrayed in relative proximity to home area 110 in FIG. 1. Tracks 114, which connect a current node to one or more nodes in the current cluster, are optional. Illustratively, display of tracks 114 may depend on a preference set by the user.

Tracks 114 may be useful when a relatively large number of nodes is displayed on the screen or in a particular area of the screen. When only a few nodes are displayed, a user may trace from home area 110 (or other current node) to a target node in the current cluster without causing ambiguity regarding his destination, and thus tracks may not be necessary.

As with tracks 114, commit points 116 are also optional. A commit point 116 identifies a point that, when reached by a user's finger, will cause a corresponding target node to be selected as the new current node. A commit point 116 may be presented or employed with or without a related track 114, and vice versa. In some implementations, commit points and/or tracks may be toggled on or off on globally (e.g., for all nodes), individually or in some other manner (e.g., when a threshold number of nodes is presented, when nodes or tracks are within some threshold distance of each other, for nodes in a particular level or cluster).

A commit point may be set at some percentage of the length of a track, at a fixed distance from the associated target node or the current node, or may comprise the associated target node itself, in which case that node must be touched to be selected. Illustratively, the latter scenario may be implemented if a relatively large number of nodes is displayed in relative proximity, in which case it may be difficult to disambiguate possible destination nodes until the user actually contacts one.

In some embodiments of the invention, and as shown in FIG. 1, multiple nodes may share a portion of a track. For example, tracks for nodes 112c, 112d and 112e are partially co-linear. In this case, commit points for these nodes (if employed) will normally be positioned at some point after their tracks diverge.

In other embodiments of the invention, and as described below, an optional magnification feature may be employed to assist with disambiguation. For example, as the user slides his finger on the surface of display 102, nodes in the general vicinity of the finger's position may move apart (and possibly expand or shrink in size). Nodes further away may move together, may shrink in size, may partially or completely fade away, or may change in some other manner.

During magnification, tracks associated with the nodes closest to the user's finger may separate further (e.g., as their nodes expand in size), thereby making it easier for the user to trace a particular track. If tracks are not displayed, the greater separation between nodes will still make it easier for the user to glide to a desired node, and will make it easier for the device to determine which node the user wishes to select, with or without commit points.

Illustratively, until a new current node is selected by a user, each node in the current cluster of nodes may be considered a possible target of the user's navigation. When implemented, tracks 114 need not be straight and need not be non-intersecting. For example, and as shown with tracks to nodes 112c and 112e, a track may curve around one or more nodes to reach its associated node, and/or may cross one or more other tracks.

A characteristic of a track 114 may provide information to a user or reflect a user's action. For example, the width, color or other characteristic of a track may indicate how frequently that user and/or other users have traversed that track or selected the associated node.

However, when a user selects a node, such as by touching it or by reaching a commit point within the node's track, additional nodes representing content reachable from the new current node may be displayed. Thus, if home area 110 is envisioned as the root of a tree of content accessible on the device comprising display 102, and the initial current node, each selection of a node navigates the user closer to a desired content item or action.

Optionally, multiple clusters of nodes may be presented simultaneously in the GUI. This may help the user decide where/how to navigate, because he or she can see which types of content (and/or specific content items) are reachable via different paths. This differs significantly from traditional browsing, wherein a user may have to click through several successive links/levels before realizing that his current path is incorrect.

If the user navigates in the reverse direction in a GUI (e.g., toward a home area or root), one or more clusters of nodes relatively distant from the root may disappear. In other embodiments of the invention, however, once a new current node is selected, the position of the previous current node (or home area) may be occupied by the current cluster of nodes. In these embodiments, a particular node may be designated as a "back" or "return" node for retracing navigation, or some other action may be taken by the user to return to a previous current node (or home area).

In one implementation of an embodiment of the invention depicted in FIG. 1, a first cluster of nodes (nodes 112 in FIG. 1) may be static or predetermined. For example, they may correspond to some or all types of content the user may access (and actions the user may initiate) with the device. For example, node 112a may represent "messages" (e.g., SMS messages, electronic mail, tweets); node 112b may represent "music"; nodes 112c-112e may represent "recent calls" (e.g., to call a recent number, to review missed calls), "dialer" (e.g., to dial a specific phone number) and "directory" (e.g., to find a contact to call); node 112f may represent "browser" (e.g., to browse on-line content); node 112g may represent "map" (e.g., to see a map of the user's current location). This example is merely illustrative; first clusters of nodes in other implementations may be significantly different and may include different numbers of nodes.

For example, in other implementations, some or all nodes in the first cluster of nodes may be associated with a single type of content or action. In these implementations, the GUI's initial view may differ depending on how the user activates it. Thus, different buttons or controls on the device may open it for different uses, such as telephonic (e.g., make a call, check missed calls, access voice mail, access phone directory), messaging (e.g., read or create a message), viewing/listening to media content, etc.

With telephonic use as an example, nodes 112a, 112b, 112f, 112g may initiate calls to four specific locations/people (e.g., home, office, spouse, best friend), while nodes 112c-112e may be used to redial the number that was last dialed, dial a specific number, lookup a number (e.g., from a directory or list of recent calls), etc.

In yet another implementation, the first cluster of nodes may depend on the user's current geographic location (e.g., as determined by an on-board GPS receiver). For example, such nodes may represent actions such as displaying a local map, identifying nearby restaurants or shops, opening tweets associated with the area, opening a tourist guide to a description of a nearby landmark, etc.

In some embodiments of the invention, a user may be able to choose specific content that should (or should not) be included in the first cluster of nodes. For example, she may be able to specify that certain content/actions are to be included among nodes 112. Or, the first cluster of nodes may be dynamic, or a combination of static and dynamic, wherein one or more nodes are included in the cluster if the user has selected that node relatively frequently or recently.

Nodes representing some content items or collections may have different appearances and/or may be positioned for easier selection. For example, if the user is navigating in order to place a call, nodes representing people or telephone numbers that he has called frequently may be presented prominently, or before nodes used less frequently or less recently.

In general, for a user navigating via finger, it may be most convenient to place the user's preferred content relatively close to the current finger position (e.g., close to the current node). As indicated above, preferred content may be content accessed or activated most recently or most frequently.

Further, the GUI may avoid placing nodes (or may only place less popular or less frequently used nodes) in locations more difficult to reach or to see. For example, when a user navigates via gliding her finger, her hand or wrist will likely block some area of the touch-screen display, especially in the 4-5 o'clock position for a right-handed user and the 7-8 o'clock position for a left-handed user. These areas may be left devoid of nodes or used for special action (e.g., moving backward through the GUI, pausing or locking navigation, answering an incoming call).

In some embodiments of the invention, preferences set by the user may control how nodes are presented, instead of or in addition to which nodes are presented. For example, she may be able to specify a maximum number of nodes to display in a level, how the nodes are arranged, which ones are most easily accessed, whether the display should be biased for use by a left-handed or right-handed person, and may be able to select display characteristics of different nodes (e.g., color, shape, size), or how to determine which display characteristics to apply, and so on.

Although a set or cluster of nodes may be predetermined or static in some embodiments of the invention, in other embodiments a cluster of nodes may be dynamic, and in yet other embodiments, may be partially populated in a static manner and partially populated in a dynamic manner. For example, where the current node corresponds to a web page, a cluster of nodes reachable from the current node may correspond to links (e.g., hyperlinks) within that web page.

As another possibility, the dynamic creation of a cluster of nodes while a user navigates the world-wide web may take into account a chain of links. For example, the current node may correspond to a particular web page, which was reached via a sequence of one or more hyperlinks. A cluster of nodes for navigating from the current node may be configured based on that sequence of links plus links embedded within the web page.

Dynamic assembly of a cluster of nodes may be based on the user's prior activity with (e.g., navigation of) a set of electronic content, other users' activity, the current date (or day of the week or time of day, etc.), the user's current location, the user's membership in affinity programs or other organizations, or virtually any other information.

For example, as the user navigates an implementation of the GUI to select one or more contacts to whom a text message (or other communication) will be sent, one or more dynamically configured nodes may correspond to the people that the user has most frequently or most recently texted. As another example, while using the GUI to navigate an electronic newspaper or a section of a newspaper (e.g., at www.usatoday.com), nodes may be dynamically configured to offer access to articles that have been popular among other viewers.

As a further example, if the user is navigating entertainment options, dynamic nodes may be offered that correspond to nearby theaters, shows at those theaters, show times and/or other information relevant to her current location. Yet further, while navigating dining options, she may be presented with nodes corresponding to special offers based on the current time or date (e.g., lunchtime, dinner time), her membership in a program (e.g., Groupon, LivingSocial) that has an offer nearby, etc.

Figure 2:
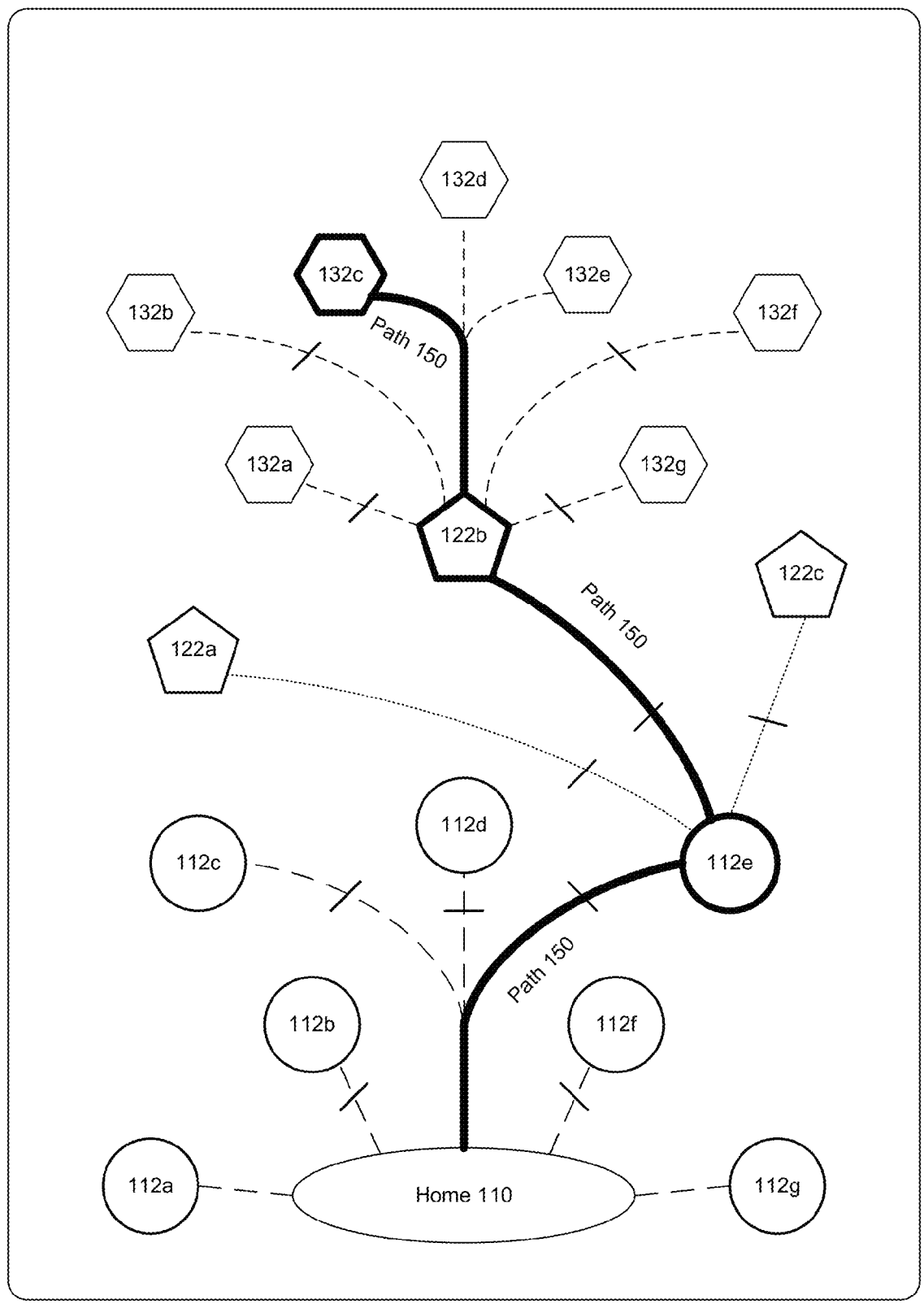
FIG. 2 is a view of a graphical user interface in which a user has navigated to a final node, according to some embodiments of the present invention.

FIG. 2 illustrates screen 102 after a user has navigated through a first cluster of nodes 112 and a second cluster of nodes 122 to reach a destination node 132c in a third cluster of nodes, according to some embodiments of the invention. In some embodiments, any (or all) portions of the tree through which the user has navigated may remain displayed, as in FIG. 2; in other embodiments, one or more previous levels of nodes may be erased from the screen.

As another alternative, only the path actually navigated by the user, such as the tracks to/through nodes 112e, 122b and 132c may remain displayed after the user selects node 132c. As yet another alternative, characteristics of a track, node or other portion of the display (e.g., color, brightness, size) may differ depending on whether the user navigated through that portion. For example, nodes not on path 150 may be dimmed or otherwise de-emphasized.

As shown in FIG. 2, reaching a desired node and activating or accessing the corresponding content may require navigation through multiple levels or clusters of nodes. Each node in path 150 is selected as the new current node, in turn, as the user's finger glides along the surface of display 102. As each node is selected, a related cluster of nodes is then displayed (if not already displayed). In some implementations, at any point while navigating path 150, the user may be able to retrace the path in order to take a different track.

Because display 102 may be relatively small (e.g., on a smartphone), action may be taken to conserve or reuse screen space in some embodiments of the invention. In particular, at any point in the user's navigation, the display may be reorganized or refreshed to conserve space, to rearrange the GUI view (e.g., the displayed graph of nodes) to help the user disambiguate nodes/tracks, to reflect the user's navigation, to aid the user's navigation, or for some other purpose.

For example, if the user's path of navigation approaches a boundary (i.e., side, top, bottom) of screen 102, the display may automatically scroll to place the current node closer to the center of the display and/or closer to home area 110. Alternatively, various sequences or combinations of finger movements, device movements and/or other input (e.g., verbal) may be applied to scroll the display and/or take other action.

For example, to scroll the display (or perform some other action, such as re-centering the display), the user may touch the display with another finger to temporarily "lock" or "pause" navigation, drag one or both fingers in the direction in which the display should be scrolled, and then release one or both fingers to resume the navigation mode. Other possible input actions may include touching the display with multiple fingers, moving multiple fingers in different directions, tapping on the display (M times with N fingers, wherein M, N≥1), simply lifting one or more fingers from the display, etc.

Various other facets of a user's interaction with his device or display 102 may serve as input to the GUI, beyond location (e.g., x-y coordinates) and direction of movement. Such facets may include speed of movement, the amount of pressure applied by the user's finger, finger rolling and/or others. Finger rolling may involve rolling a fingertip at a current location, which may allow finer movement, perhaps to help disambiguate multiple nodes.

As another example of aiding a user's navigation, as the user's finger approaches a boundary, display of a subsequent cluster of nodes may be biased away from that boundary. This may be seen in FIG. 2, wherein when node 112e is selected as the current node, presentation of the second cluster of nodes (i.e., nodes 122) is biased toward the unused area of display 102, and away from the side of screen 102 that is proximate to current node 112e. Similarly, display of the GUI may rotate (e.g., to be landscape-oriented vice portrait-oriented) if the user takes some action (e.g., rotates the device or screen, expresses a preference for such a view) or if doing so would make navigation easier.

As another measure for conserving screen space, and if commit points (such as commit points 114 of FIG. 1) are employed, when a user reaches a node's commit point, that node may move to the location of the user's finger (e.g., by scrolling the display to that point, by retracting the node's track so that the node is now at the commit point). This not only helps conserve screen space, but also reduces required finger movement.

The sample navigation illustrated in FIG. 2 uses relatively widely spaced nodes. In some embodiments of the invention, nodes may be spaced much closer together, such that less than an inch of finger movement is needed to select a new node, for example.

To aid in navigation or in the selection or activation of content, any number of "action spots" may be provided within or in association with the GUI. Such spots may be used for locking or pausing the GUI, for resetting navigation (e.g., returning to the home area), for activating content or an application associated with a node, for answering an incoming call, for zooming in or out, for accessing bookmarks, or for virtually any other action that may assist the user in navigation to content and/or manipulation of content.

For example, after using one finger to navigate to a particular contact in a directory (e.g., a friend, a relative), a user may use the same finger or another finger to tap an action spot to make a call to that contact, to start a text message to that contact, etc. Alternatively, of course, nodes for taking action in relation to that contact may be displayed as a new current cluster of nodes after the contact's node is selected as the new current node, or such actions may be offered via a list, a drop-down menu or in some other manner.

In some embodiments of the invention, activating an action spot may activate a particular mode of operation of the GUI. One such mode may be a "fly" mode, wherein the user may lift a finger from the screen (e.g., from a current node) in order to select a relatively distant object (e.g., instead of gliding a finger all the way). Another mode may be a "scroll" mode, wherein finger movement causes the display to scroll. Another mode may be a "pause" mode, wherein the user may take other action during the pause (e.g., use the device for a different purpose), but the GUI will be re-displayed with substantially the same appearance after the pause mode is terminated.

Action spots may be displayed in static positions on the display and/or may be dynamic. For example, an action spot may be positioned a convenient distance from the user's current finger position (e.g., to allow contact by the same finger or another finger), may be displayed within the current (or other) cluster of nodes, may be arrayed along a boundary of screen 102, etc.

As a user navigates, if she lifts her finger from the display, navigation may automatically pause (e.g., until the screen is touched again), the node selected last may be activated (e.g., to open the corresponding content or execute the corresponding application or utility), or some other action may be taken. For example, as another measure for conserving or reclaiming screen space, lifting a finger (or activating a particular action spot) may cause the current node or navigation location to snap to the location of a default area (e.g., home area 110, a particular position on screen 102).

When the user is navigating via mouse or other tool, instead of touching a touch-screen display, clicking or releasing a mouse button or comparable control may correspond to lifting her finger from a touch-screen display.

Releasing a finger from the screen may instead act as input, for example, so that content corresponding to the current node is activated when the user lifts his finger from that node, instead of when he selects the node. Lifting a finger while navigating, but while the finger is not over or in contact with a node may mean something different (e.g., pause navigation).

FIGS. 3A-E illustrate a Graphical User Interface (GUI) for assisting a user's selection of desired content, according to some embodiments of the invention.

Figure 3A:
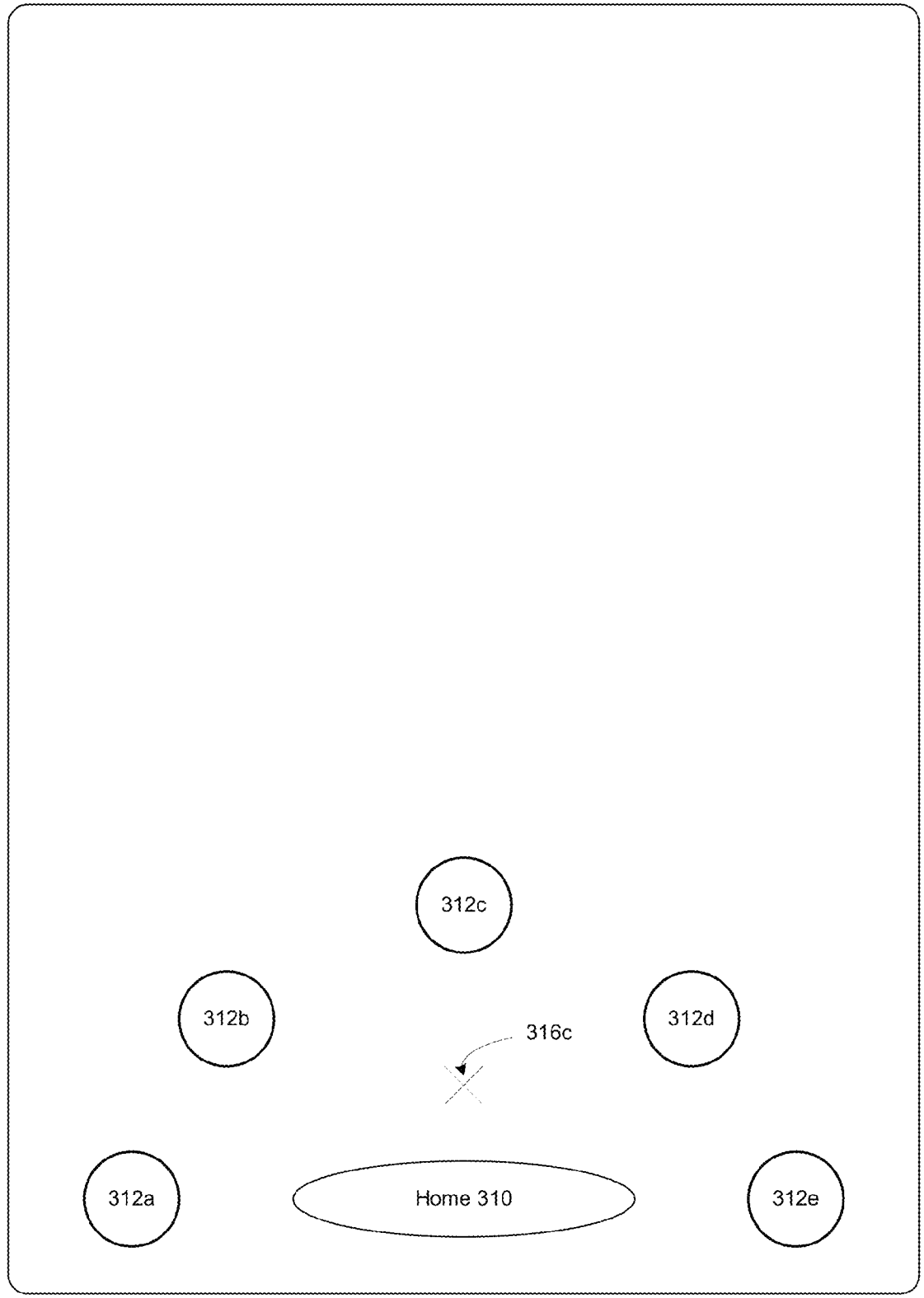
FIGS. 3A-E are views of a graphical user interface according to some embodiments of the present invention.

The cluster of nodes 312 reachable from home area 310 of FIG. 3A is relatively sparse. They are arrayed in an arc and easily accessible from the home area. Because there are relatively few nodes displayed, they can be easily disambiguated almost as soon as the user begins gliding her finger toward a node 312. Therefore, it can be easily determined which is the likely target node, even without tracks or commit points.

Figure 3B:
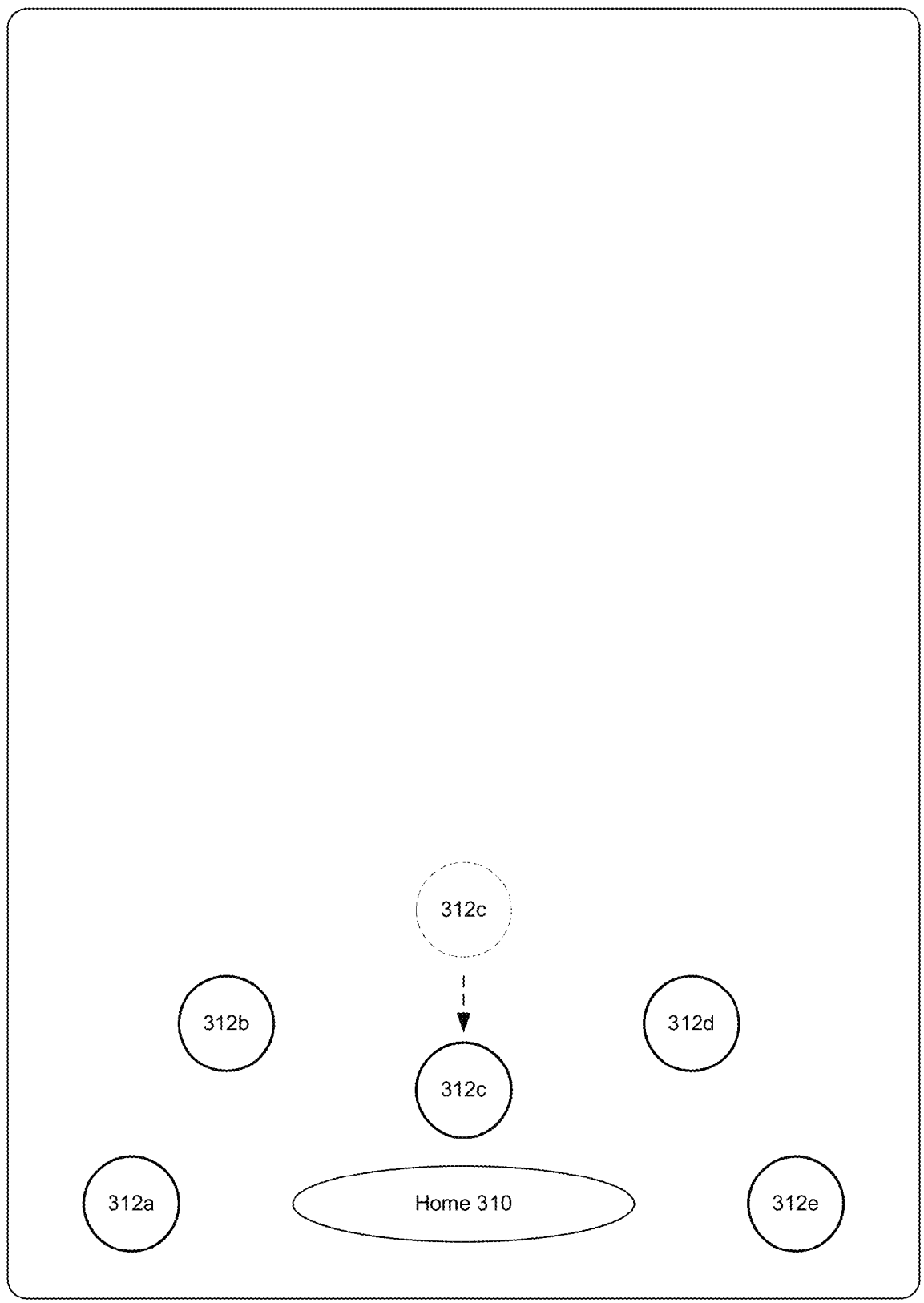

However, commit points may be employed without being displayed, and may be used to assist navigation and conserve screen space. For example, as shown in FIGS. 3A-B, as the user glides toward node 312c and encounters invisible commit point 316c, node 312c may be adopted as the new current node and may snap toward the location of her finger or the commit point. Thus, very little finger movement may be needed to select a node 312.

It may be noted that the user need not touch point 316c to activate the commit point. Illustratively, an unmarked region of screen space encompassing the commit point may collectively act as the commit point, so that simply entering or approaching the region causes the commit point to be tripped.

If a cluster of nodes had been displayed connected to node 312c, and/or if clusters had been connected to other nodes, they may move in the same manner as node 312c. In addition, when a new current node is selected, other nodes in the same cluster as that current node may be removed from the display. This may be done to conserve screen space.

Figure 3C:
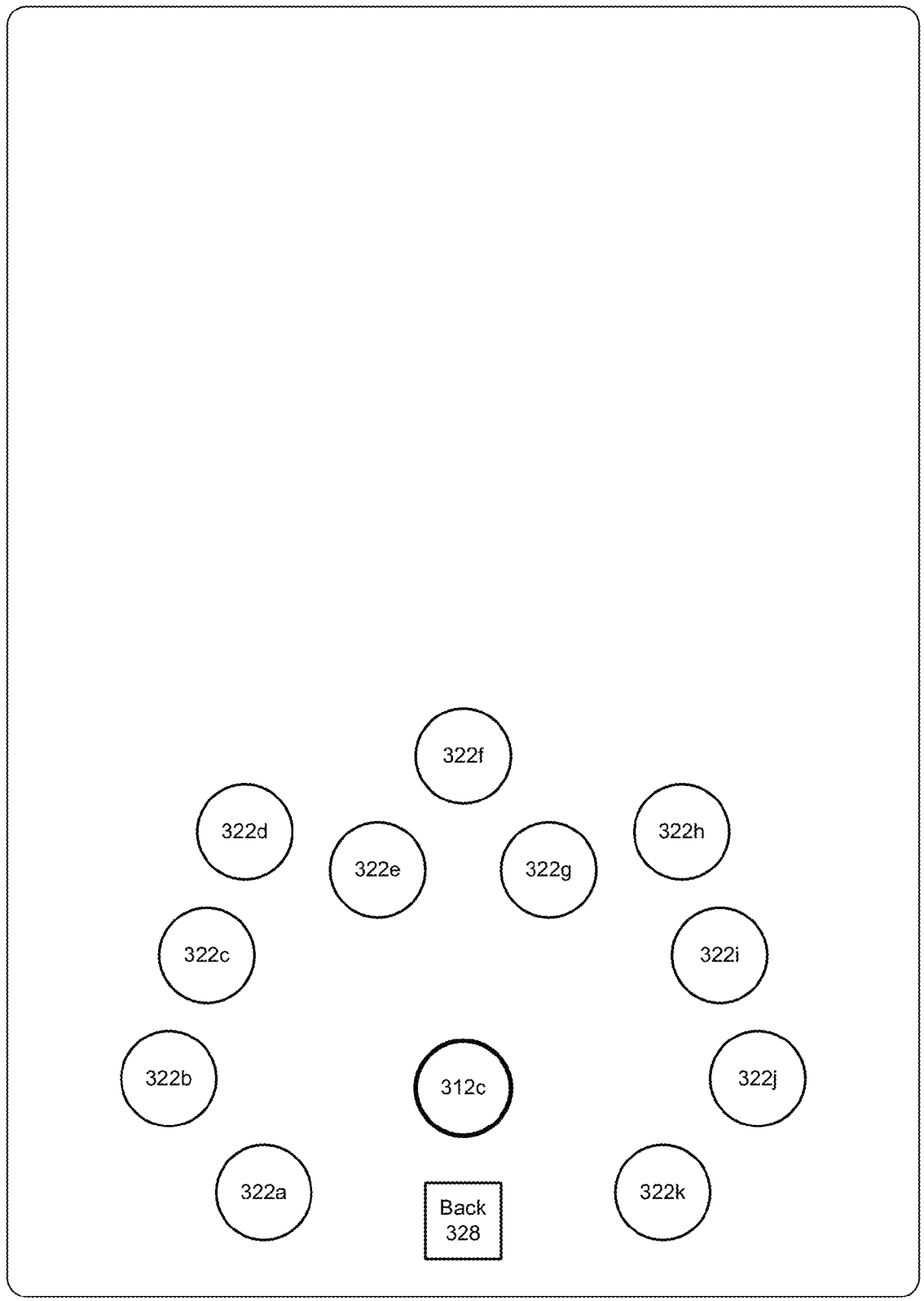

FIG. 3C illustrates the GUI after node 312c is selected and the next cluster, having a relatively large number of nodes 322, is displayed. Siblings of node 312 have been removed from the display. Illustratively, nodes 322 may be specific content items (e.g., songs, messages) or sub-categories encompassed within a category/compilation of content corresponding to node 312c.

Again, in FIG. 3C, tracks and commit points are optional. If not employed, disambiguation among possible target nodes may depend on the user gliding her finger close, or all the way, to the node she desires.

Besides nodes representing content, other types of nodes may be presented to assist navigation. For example, in FIG. 3C, back node 328 is provided to allow the user to quickly return to the previous current node. In this example, selection of the back node would return the user to a context in which home area 310 was once again the current node.

Thus, selecting back node 328 may cause display 302 to be refreshed, to replace the current view in FIG. 3C with a view similar to that of FIG. 3A. To avoid unnecessary finger movement, after selecting "back" the previous current node may be displayed at the position of the user's finger. A "back" node may be displayed in any portion of display 302, not just below or behind the current node and, similarly, a regular node (e.g., a node 322) may be placed where back node 328 appears in FIG. 3C.

Figure 3D:
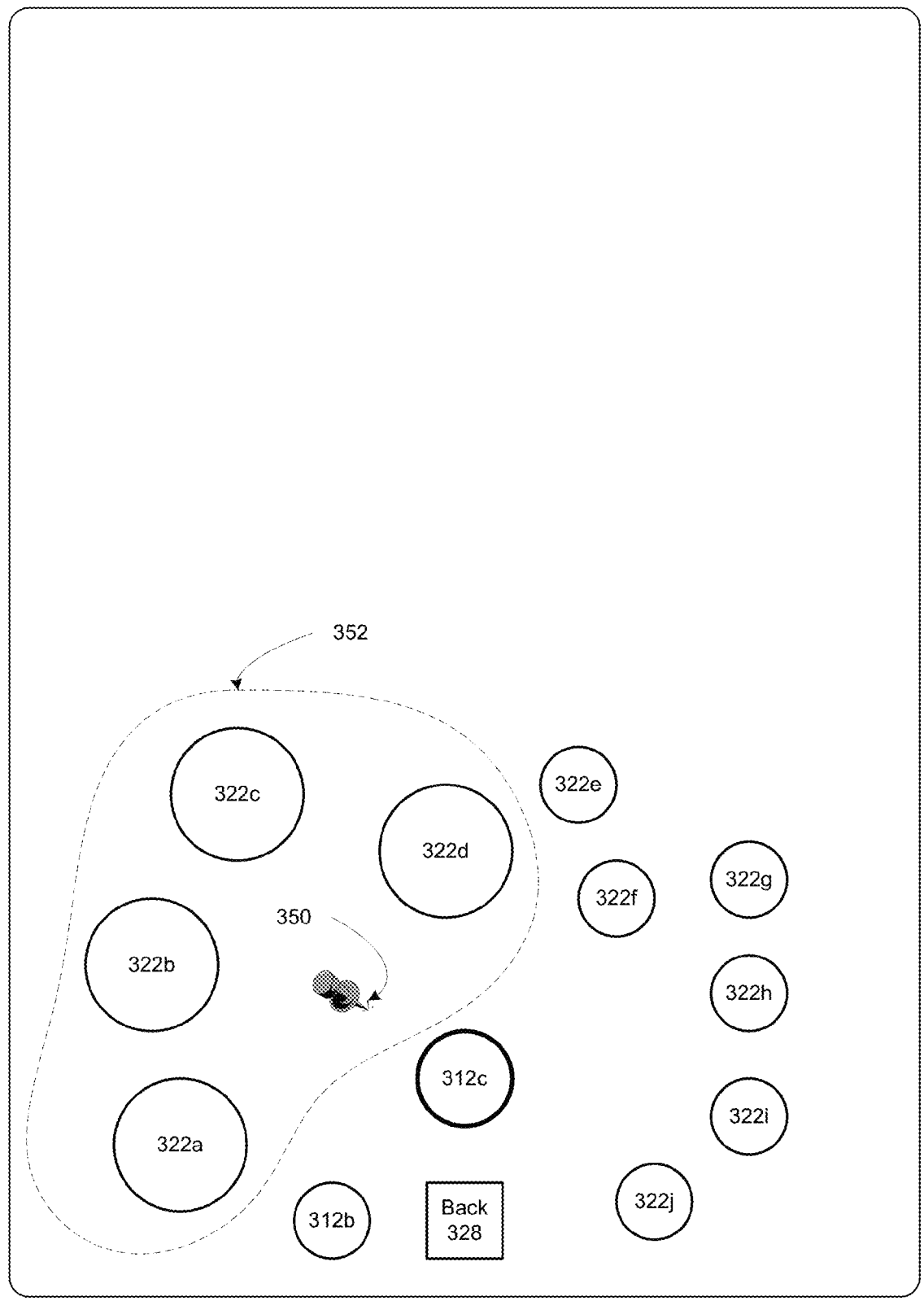

In FIG. 3D, as the user glides towards a subset of nodes 322, a magnification or reverse gravity effect is applied to expand and/or separate those nodes and make it easier for the user to select one, or easier for the apparatus or system to determine which node the user is selecting. In particular, as the user's finger approaches point 350, which has multiple proximate nodes, the system or device automatically applies the magnification effect to area 352, which encompasses that set of nodes.

As shown, nodes relatively distant from point 350 may shrink and/or move together. Through preference settings, a user may be able to turn this effect on or off, initiate it manually (e.g., with an action spot, by touching another finger to the screen), alter how the magnification zone operates (e.g., size, shape, amount of magnification), etc.

In one implementation, the magnification effect is applied when more than one node, or more than one commit point, or at least one node and one commit point, are within a threshold distance of the user's current finger position.

In another implementation, the magnification effect may be applied when more than one node lays within a general direction in which the user's finger is gliding. Illustratively, this implementation may entail several steps, such as: (a) noting the actual path the user has traced from the current node, (b) calculating vectors extending at some angle to this path, on both sides of the path, and (c) identifying how many nodes lie between extensions of the two vectors.

Figure 3E:
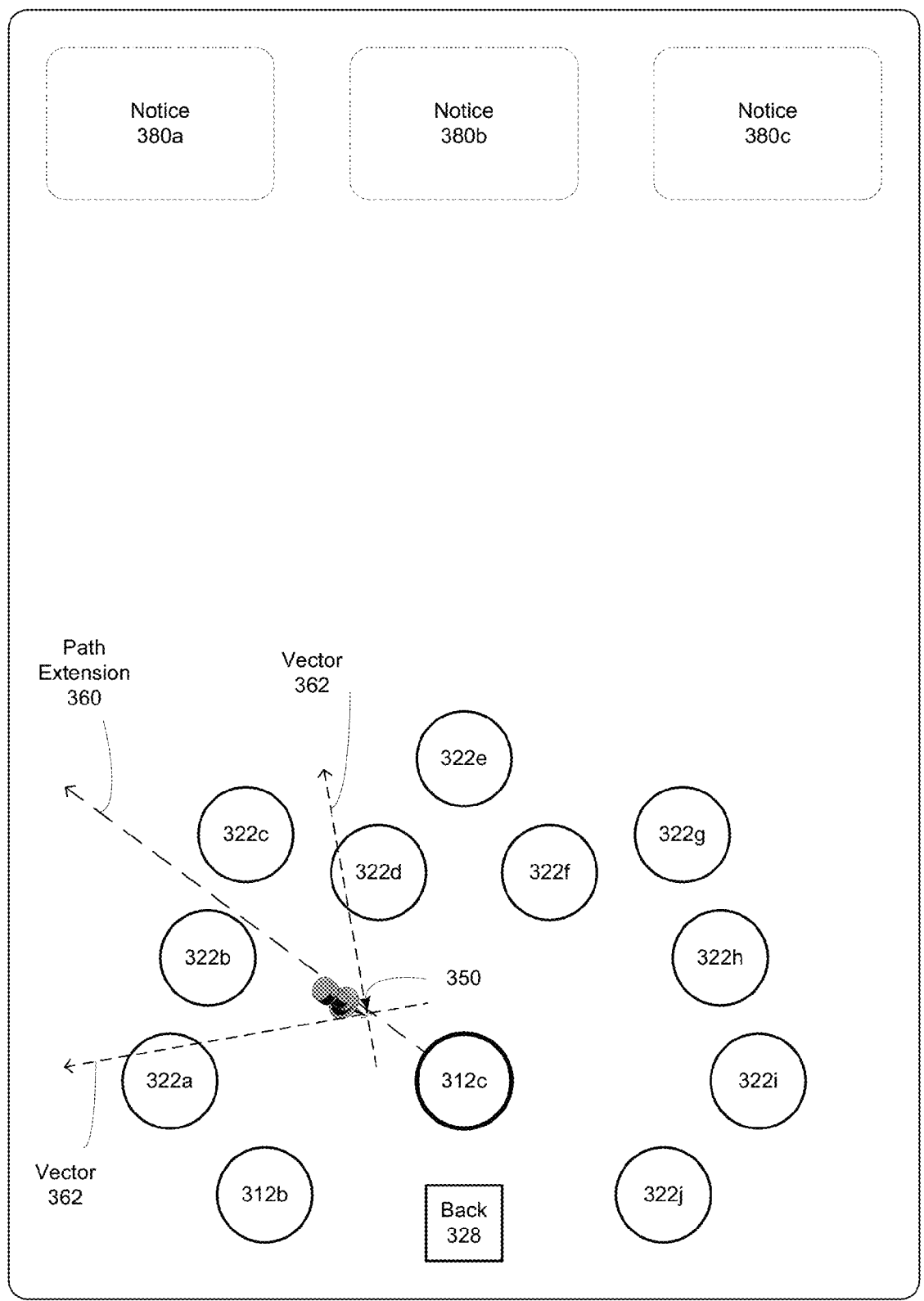

FIG. 3E illustrates the latter implementation, wherein path extension 360 is an extension of an observed or direct path from current node 312c to the current location of the user's finger (i.e., point 350). Vectors 362 extend at 45° angles from path extension 360; this angle may differ from one embodiment to another (e.g., 90°, 60°, 30°). As seen in FIG. 3E, nodes 322a-322d are partially or fully within a sector of screen space bounded by vectors 362. In some alternative implementations, a node must lie fully or primarily within the vectors in order to be included in a magnification zone.

Magnification zone 352 may change as the user continues to glide his finger toward his destination. Thus, nodes may be removed from or added to the zone before a new current node is selected. Illustratively, when only one node remains in a magnification zone, it may be automatically selected. If/when the user navigates completely through a magnification zone, or past a node in the zone, magnification may cease and the nodes may resume their previous appearance.

In some embodiments of the invention, magnification zones may primarily be used with "end" nodes—i.e., nodes that will end the user's navigation. Such end nodes may represent specific content items within a particular type of content (e.g., songs, video clips, text messages, contacts), in which case that content may be opened or played. In other embodiments, a magnification zone may be applied anytime disambiguation between multiple nodes would be helpful.

When multiple actions are possible for a selected node, the available options may be presented via action spots, via additional nodes (i.e., a new cluster of nodes), via a screen refresh that displays a new GUI view, as a menu or in some other manner. For example, when a user navigates to a specific contact within a directory of contacts, several options may be offered—such as to call that contact, send a text message to that contact, edit the contact, delete the contact, etc.

In some embodiments of the invention, a GUI may be designed for use with very little movement of a user's finger or other tool, so as to allow for rapid traversal of the GUI by the user. In these embodiments, a default distance from a current node to nodes in the current cluster of nodes may be on the order of ¼ inch or ½ inch (and/or may be adjusted as a user preference), thereby allowing a user to make a selection with very little movement. Yet further, if commit points are used (e.g., as described above), even less movement may be necessary.

Embodiments intended to reduce finger movement may include various other features to facilitate navigation. For example, all nodes in the current cluster may be packed close together (and close to the current node). As the user's finger starts to move, a magnification zone may be applied in the direction of the movement, nodes not in the direction of movement may recede (e.g., shrink, fade), etc.

In some embodiments, when few nodes remain in a direction of finger movement (e.g., 2, 3, 4), they may gravitate toward the user's finger to make her selection even easier. This action may not be necessary if commit points are enabled.

When a new current node is selected, it may shrink to a very small size (compared to its size before it was selected) so that the next cluster of nodes can be presented proximate to the position of the user's finger. If some area surrounding the current node is to be left free of nodes (e.g., because they would be blocked by the user's hand or wrist), this may reduce the number of nodes displayable in a current cluster or set.

Some embodiments of the invention designed to require very little finger movement may be suitable for devices with small touch-screen displays. In one implementation of such an embodiment, each cluster of nodes may be limited in quantity, perhaps to a number that can graphically presented close but equidistant to a point, arc or other shape representing the current node. Because they are presented close to the current node, a simple finger roll (e.g., rolling the user's fingertip) may suffice to select a node (by touching it or a corresponding commit point).

The GUI may then move the selected node into the position of the current node, and the user may then unroll her finger back to its starting position. She may then roll it again to select a next node, unroll it to rest, roll it again to select a next node, and so on.

Another embodiment of the invention designed to minimize required finger movement may be particularly useful when clusters of nodes are relatively small in size. In this embodiment, illustrated in FIGS. 8A-C, a user may simply glide her finger back and forth between clusters of nodes displayed opposite each other. Each successive cluster of nodes is positioned across from the previous, such that if the user moves her finger "upward" on her touch-screen display to select a node from one cluster, the next set of nodes will be positioned such that she will move her finger "downward" to select one. Thus, she may navigate simply by gliding back and forth across a relatively small area of her device.

Figure 8A:
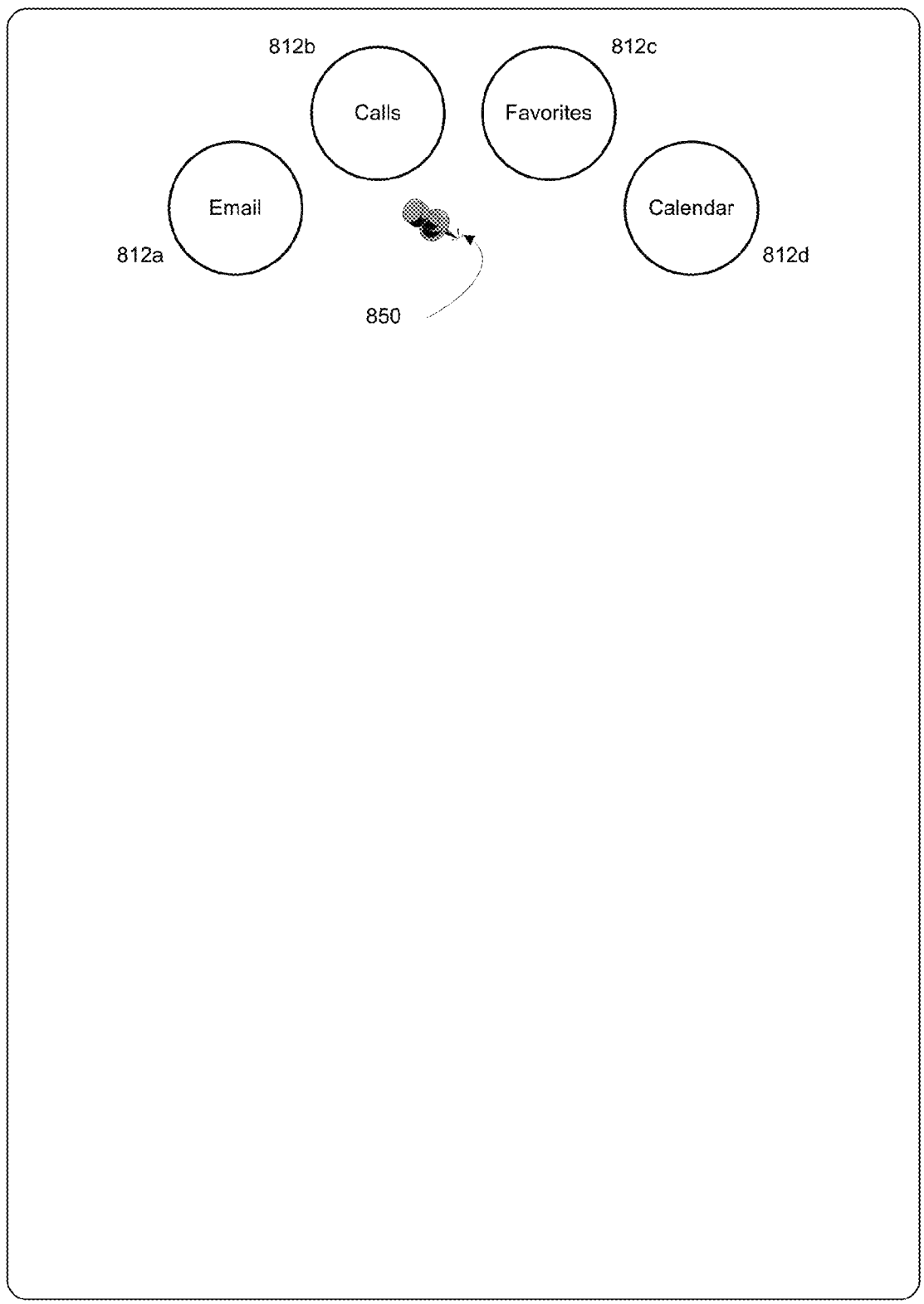
FIGS. 8A-C are views of a graphical user interface for navigating electronic content via gliding, using a relatively small area of a touch-screen display, according to some embodiments of the invention.

In FIG. 8A, the user initiates navigation by touching somewhere on touch-screen display 802, such as point 850. A first set of nodes 812 is displayed close to the starting position, offering a few top-level choices, such as "Email," "Calls," "Favorites" and "Calendar". The color, size, shape, brightness, labels and/or other characteristics of the nodes may differ to make it easy to rapidly identify their nature.

Figure 8B:
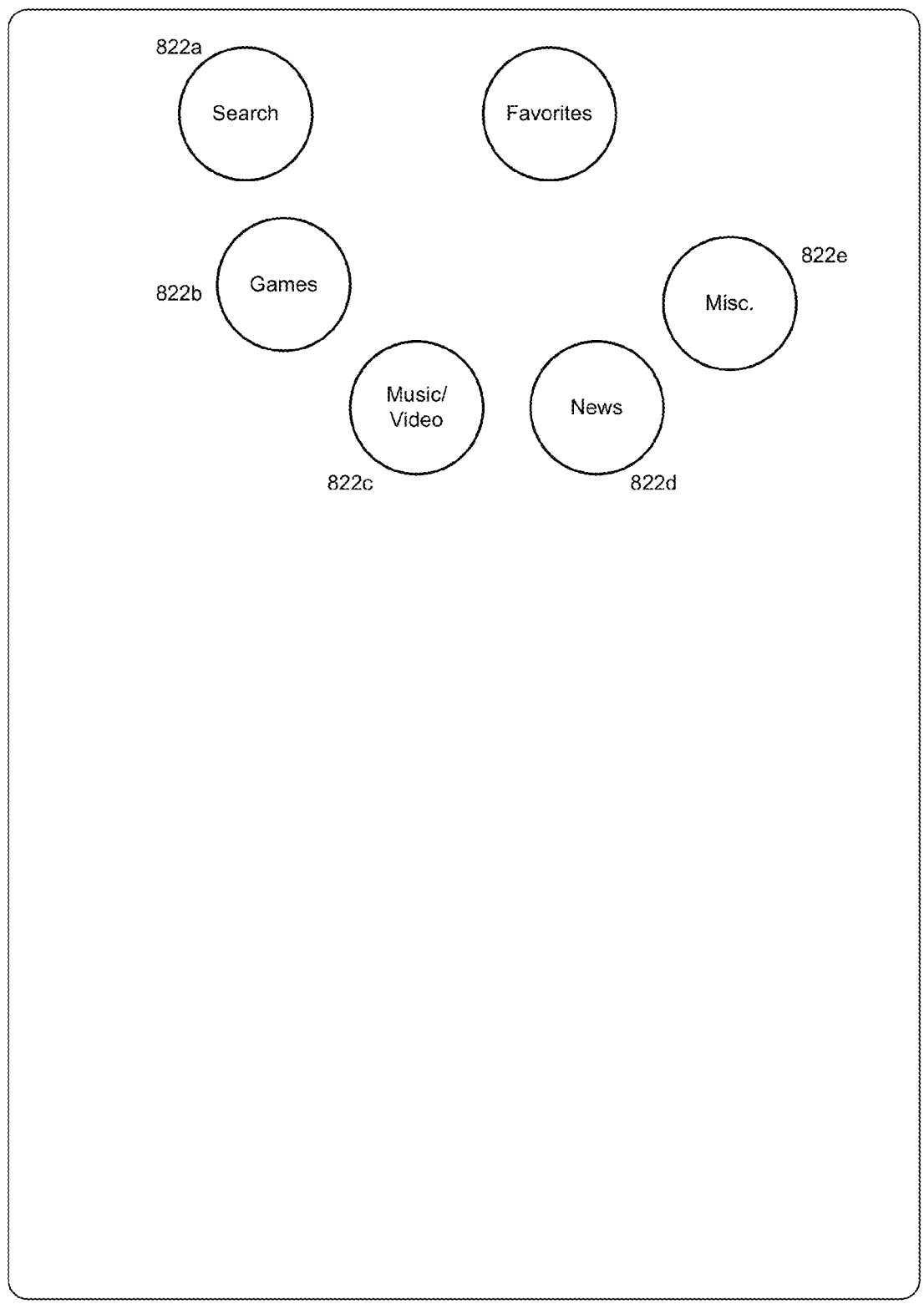

FIG. 8B shows the GUI after one of the nodes 812 is selected, say "Favorites" node 812c for accessing favorite web sites, and a new cluster of nodes 822 is presented to offer options within that category, such as sub-categories including "Search," "Games," "Music/Video," "News" and "Miscellaneous".

Figure 8C:
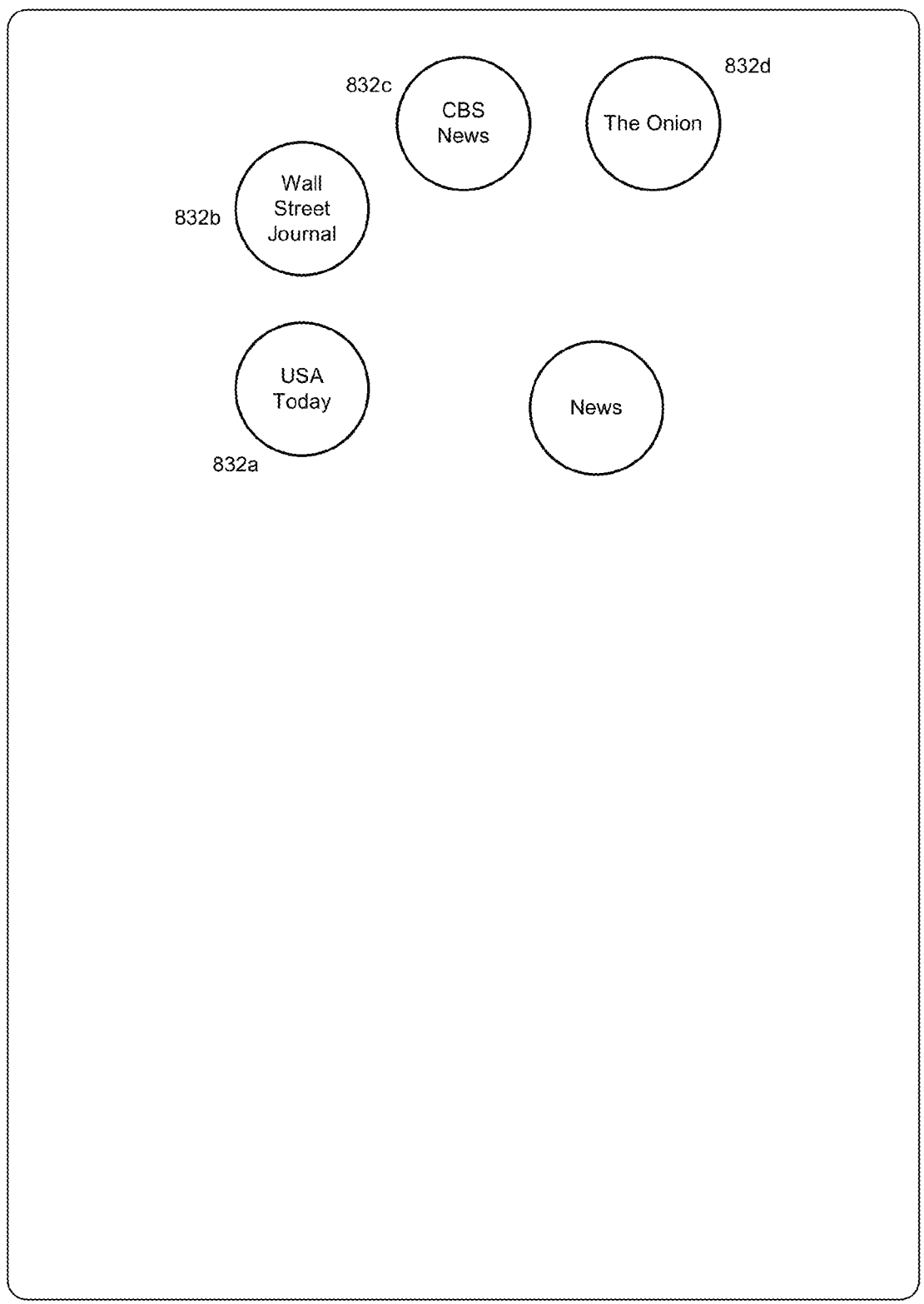

Assuming node 822d is selected, FIG. 8C presents a subsequent view of the GUI, wherein nodes 832 corresponding to home pages of the users' favorite news sources are offered, such as "USA Today," "Wall Street Journal," "CBS News" and "The Onion".

FIGS. 8A-C demonstrate that embodiments of the invention may be implemented to facilitate navigation to/through content via gliding, using a relatively small area of a touch-screen display.

In some embodiments of the invention, as a user glides his finger through the GUI, content encompassed by any number of nodes may be pre-fetched or cached, including nodes in the current cluster and/or clusters two or more levels downstream of the current node. Such content may then be presented or opened faster if and when the user selects one of those nodes.

In embodiments of the invention in which audio input is possible, a user may select a new current node by speaking a name or label associated with that node. The system may use audio output to announce one or more nodes or identify content items or collections/categories that the user may select.

In some embodiments, the GUI will avoid placing nodes or other components of the GUI (e.g., action spots) in areas likely to be blocked by the user's hand (assuming she is using a finger to navigate). Also, when magnification is applied, to ensure the magnified nodes are displayed on-screen (e.g., instead of being moved outside of the displayable area of the screen), some or all nodes (or the entire GUI) may rotate, reshape or otherwise be adjusted.

In some embodiments, alerts (e.g., of software updates, new messages), advertisements and/or other notices may be presented, as shown in FIG. 3E. In the illustrated example, notices 380 are presented near the top of the screen, but may be presented in other areas, depending on the locations of displayed nodes, how the device is being held (e.g., portrait, landscape) and/or other factors. For example, a "floating" notice may move from one location to another on the screen as the GUI's tree of nodes expands or otherwise changes. The nature or content of a floating notice may remain the same (e.g., a notification of a new text message) or may change as it floats (e.g., depending on the type of content corresponding to the current cluster of nodes).

A notice may or may not be relevant to content represented by a node displayed in the GUI. For example, if a user is navigating the GUI to choose music to be played, a notice may pertain to a concert, a new album, a music store, etc. Further, a notice may be actuable, meaning that tapping on or gliding to it may open the notice to provide information, may open a browser window, may initiate a software update, etc.

In some embodiments, context-sensitive options may be presented as GUI nodes. For example, while the user navigates music content on her device, when a node corresponding to a particular artist is presented, coupled to that node may be nodes offering concert tickets for the artist, providing show times, offering a demo of a new song, etc.

In some embodiments of the invention, a speed of movement of the user's finger (or other tool) may affect GUI operation. For example, if the user's finger is moved faster than a threshold rate, magnification and/or other alterations of the GUI's appearance may be suspended. Illustratively, when the user moves relatively rapidly, he may be moving toward a GUI object relatively far from the current node, such as a notice, an action spot or a node two or more levels away from the current node.

Multiple clusters of nodes may be presented simultaneously, meaning that not only is a current cluster of nodes displayed (i.e., nodes directly connected to the current node), but clusters connected to one or more of those nodes may also be displayed, clusters connected to one or more nodes in those clusters, and so on. Thus, the user may be able to view multiple levels of downstream nodes to which he can navigate. Instead of navigating to such a downstream node via intermediate nodes, he may navigate directly at a relatively rapid speed. Or, a user's navigation to a downstream node may be assumed when a user strays from a node's track or glides along a path not corresponding to any track.

Because the GUI temporarily ceases magnification and/or other effects during rapid gliding, the user's target will not change position, which could otherwise make it more difficult to select or land on a desired node. The movement speed that is necessary to pause magnification (or to cause other action to be taken or ceased) may be set as one of the user's preferences.

In some embodiments of the invention, the GUI may commence or be activated by various user actions. For example, a user may enter a word or phrase in a text box (or via audio input), and the GUI may be activated to guide her to what she is looking for. Each node in a first cluster of nodes in this scenario may comprise a search result or an aggregation of multiple search results.

Such an aggregation may encompass results deemed similar to each other, or results that are logically related. For example, if the user enters the keyword "pirates", different first-level nodes may represent news stories relating to current pirate activities (e.g., the hijacking of another cargo ship), the Pittsburgh Pirates baseball team, the "Pirates of the Caribbean" movies, stores selling pirate outfits, etc. A search may be performed by a provider of the GUI or device, and/or may be performed by a third-party (e.g., Google®, Yahoo®).

As another alternative, and as described above, the user may simply touch a predetermined area (or any area) of the touch-screen display or the device, and a first cluster of nodes representing top-level options may be presented.

In embodiments of the invention in which GUI operation can be guided by multiple inputs (e.g., finger movement and voice command, movement of two fingers), the inputs may be applied simultaneously or in sequence, or one input may be used to filter results of the other. Using a telephone call as an example, navigation may commence by touching the display, which may cause a first cluster of nodes to be presented, one or more of which relate to placing a call.

As the user glides his finger toward such a node, he may provide verbal input (e.g., a name) that can be used to filter presentation of a subsequent cluster of nodes (e.g., names of contacts that may be called, names of recent callers). Thus, if the user says "John" while gliding to or toward a node associated with placing a call, the next cluster of nodes may only (or primarily) include contacts that include the name "John."

A user may be able to set markers as she navigates. For example, by inputting a corresponding audio command, or by activating an action spot or other component of the GUI, the current location of her finger or current location in the GUI may be remembered. Later, she may return to that location with another command or action.

Nodes in the GUI may be personalized to make them (or their associated content) more easily identifiable for a user. For example, a node corresponding to a contact may include (or be accompanied by) a small picture of that person, nodes representing songs or videos of an artist may similarly include or be accompanied by a picture of that artist, nodes associated with sporting events may include or be accompanied by logos of the teams involved, a node associated with a music album may include a thumbnail image of the album's cover art, and so on.

In some embodiments of the invention, different node characteristics (e.g., shape, size, color, flashing) may be adopted to provide information to the user. For example, one characteristic may indicate that the node corresponds to an action or application (e.g., place a call, play a song, open browser), while another characteristic corresponds to consumable content (e.g., music, video, electronic mail).

Alternatively, one characteristic may indicate that the node is an end node (i.e., no additional cluster of nodes will be presented if it is selected as the current node), while another indicates that the node is an intermediate node (i.e., that it does have an associated cluster of nodes). Or, a characteristic may signify a particular type of content (e.g., music, video, contact, application, advertisement), may reflect how recently (or frequently) the node (or associated content) was used, or provide other information.

A set of data navigated by a GUI described herein may reside on the user's device (e.g., a directory of contacts, a collection of messages) and/or on a remote system (e.g., an electronic mail server, a file server, a web server). Similarly, the GUI software may comprise a resident application or utility, or may be served by a remote computer system (e.g., via HTML5, Adobe Flash).

In some embodiments, the GUI or a view of the GUI may be rendered in 2.5D (two-and-a-half dimensions) or pseudo-3D, so as to provide some "depth" to the GUI view and/or allow more information (e.g., more nodes) to be displayed at once.

Figure 4:
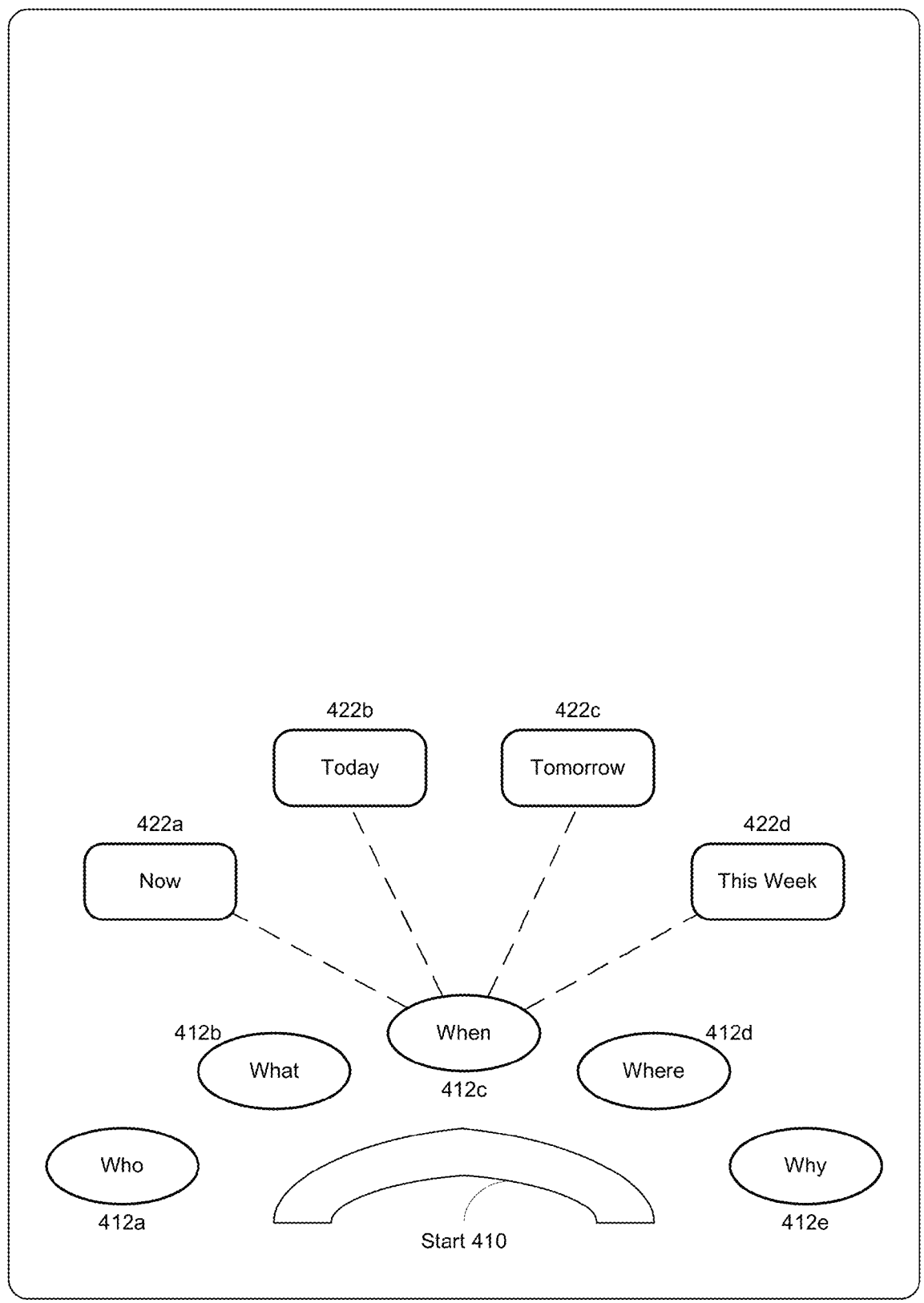
FIG. 4 is an initial view of a graphical user interface according to some embodiments of the present invention.

FIG. 4 illustrates another Graphical User Interface (GUI) for navigating content, according to some embodiments of the invention. The GUI presented and manipulated via touch-screen display 402 includes start area 410, which may be a point, an arc or some other shape.

In the illustrated embodiment, a first cluster of nodes 412 (i.e., nodes 412a-412e) encompasses general categories— i.e., Who, What, When, Where and Why. Depending on the user's intention, she selects an appropriate node. As reflected in FIG. 4, her intention may relate to time, in which case she glides her finger to or toward node 412c, and is presented with some time-based options, including Now 422a, Today 422b, Tomorrow 422c and This Week 422d. When she selects one of these nodes (or another node corresponding to a time period not shown in FIG. 4), that node may open to show a list of activities, or a cluster of nodes may be presented, each of which corresponds to an activity that overlaps or occurs during the corresponding time period.

Illustratively, instead of node 412c, she may select Who 412a to access contacts (e.g., a directory of contacts) or to obtain information regarding a particular person, What 412b to initiate a particular action (e.g., place a call, go online to shop for something, access a news site), Where 412d to find notices (e.g., tweets, advertisements, offers) pertinent to her current location or some other location, and Why 412e to access a task list, a calendar, etc.

Note that a given content item or action may be accessible via multiple nodes 412. For example, she may place a call to a friend by first navigating to that friend via Who 412a or by first navigating to a "Place a call" action via What 412b, etc.

In some embodiments of the invention, instead of (or in addition to) various screen-space conservation measures described above, one view of a GUI (e.g., a viewing showing one or more clusters of nodes) may be replaced with a new view showing one or more different clusters of nodes (e.g., instead of presenting too many nodes on the screen at one time). Illustratively this may occur when the screen becomes fairly full (e.g., with many nodes), when a user selects a particular node as the new current node, when a user activates a "refresh" action spot, and/or at other times.

Figure 5A:
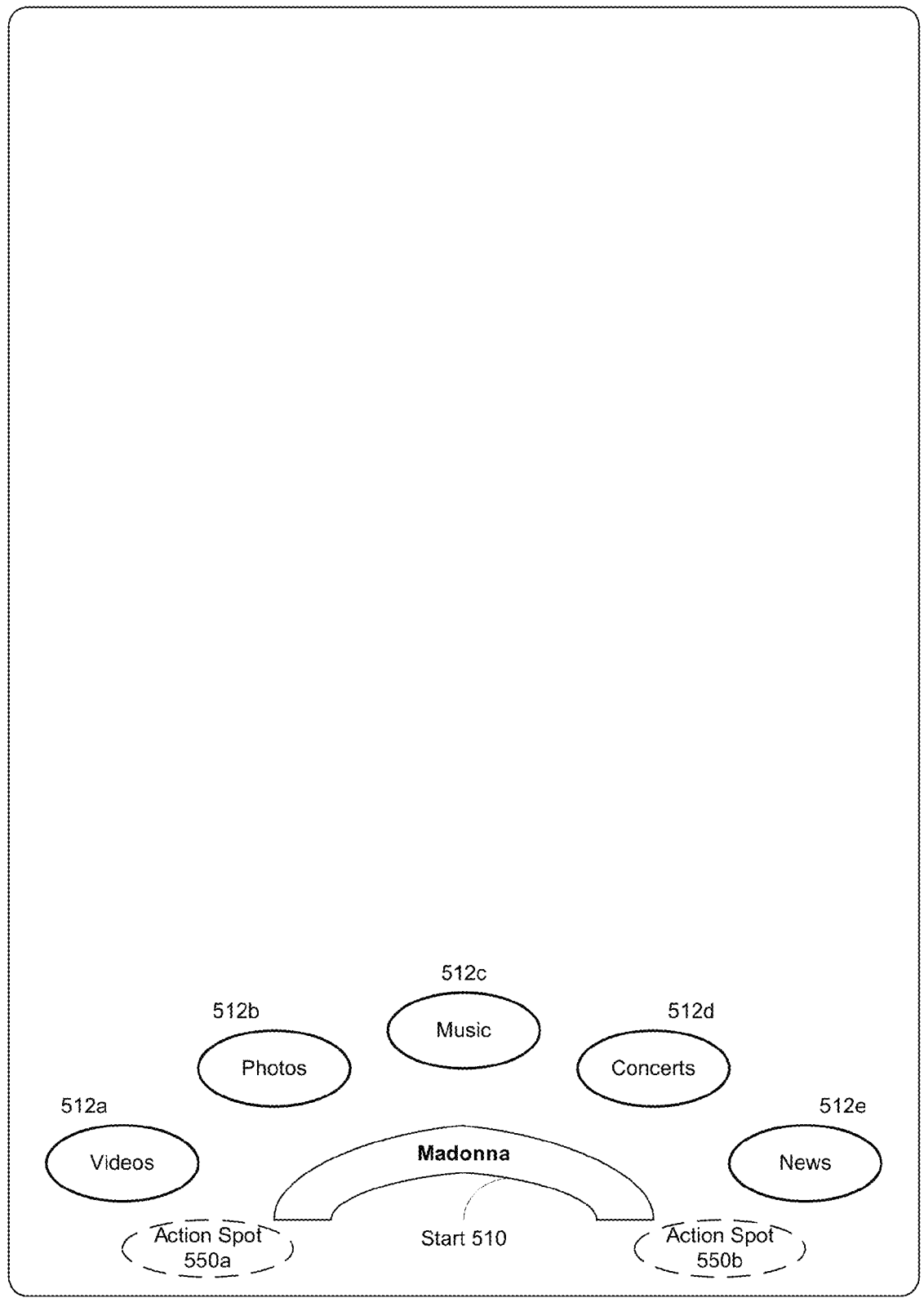
FIGS. 5A-B are views of a graphical user interface employed to facilitate navigation of content, according to some embodiments of the present invention.
Figure 5B:
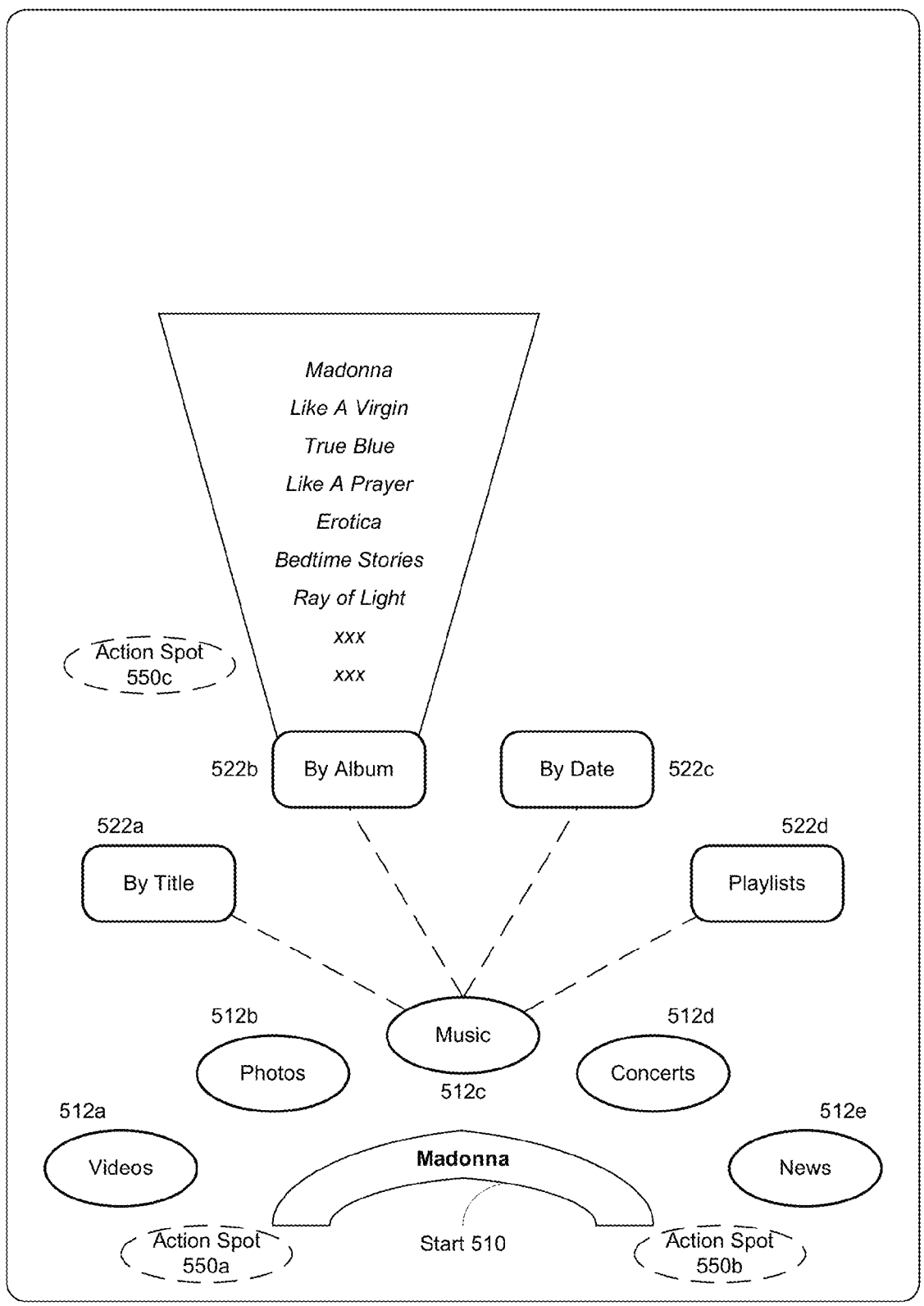

For example, while navigating to or browsing through music content stored on her device (or stored online or in some other location), she may select a particular artist (e.g., Madonna) at some level of the navigation process. As shown in FIGS. 5A-B, she may then be presented with a view focused on that selection, in order to investigate or manipulate relevant content.

In FIG. 5A, a first view after selecting "Madonna" may comprise start area 510 labeled with the selection. Because the current node (i.e., start area 510) relates to a music artist, the first cluster of nodes 512 of this view may correspond to content such as videos (node 512a), photos/images (node 512b), music (node 512c), concerts/appearances (node 512d) and news/information (node 512e).

Assuming she selects music node 512c, the user may then be presented with a suitable second cluster of nodes 522, as shown in FIG. 5B, which may offer different options for finding a particular song or set of songs. Thus, if she chooses By Album 522b, the user may be presented with a menu or list of selectable album names. Selecting one may automatically initiate a default action (e.g., play the album, buy it, download it) or open a menu or list of further options. Of course, instead of a list of options—such as that presented through By Album node 522b—another cluster of nodes may be presented to offer the options.

In some embodiments of the invention, instead of (or in addition) to node labels such as those illustrated in FIGS. 5A-B, a node may comprise or be accompanied by a logo or image. For example, a thumbnail image of Madonna may be displayed with node 512b, a miniature image of a news story may be displayed with node 512e, etc.

As described previously, optional action spots 550, which may be positioned in any area of display 502, may allow the user to quickly initiate some type of action. For examples, action spots 550a, 550b may allow her to quickly change to a different artist, such as the previous and next artists identified in the view from which she selected Madonna. Action spot 550c may initiate some type of action relevant to a selected album name (e.g., search for the title using Google®), or some completely unrelated action (e.g., open a telephone dialer or phone directory to make a call).

In some embodiments of the invention, a GUI may be designed to be descriptive so that a user can view information he desires (e.g., a score of a sporting event, the winner of an election) without having to navigate very far (or at all), and especially without having to browse through multiple layers of information. In these embodiments, in order to present useful information within a node (or in proximity to a node), nodes may be arrayed at varying distances from the current node.

Figure 6A:
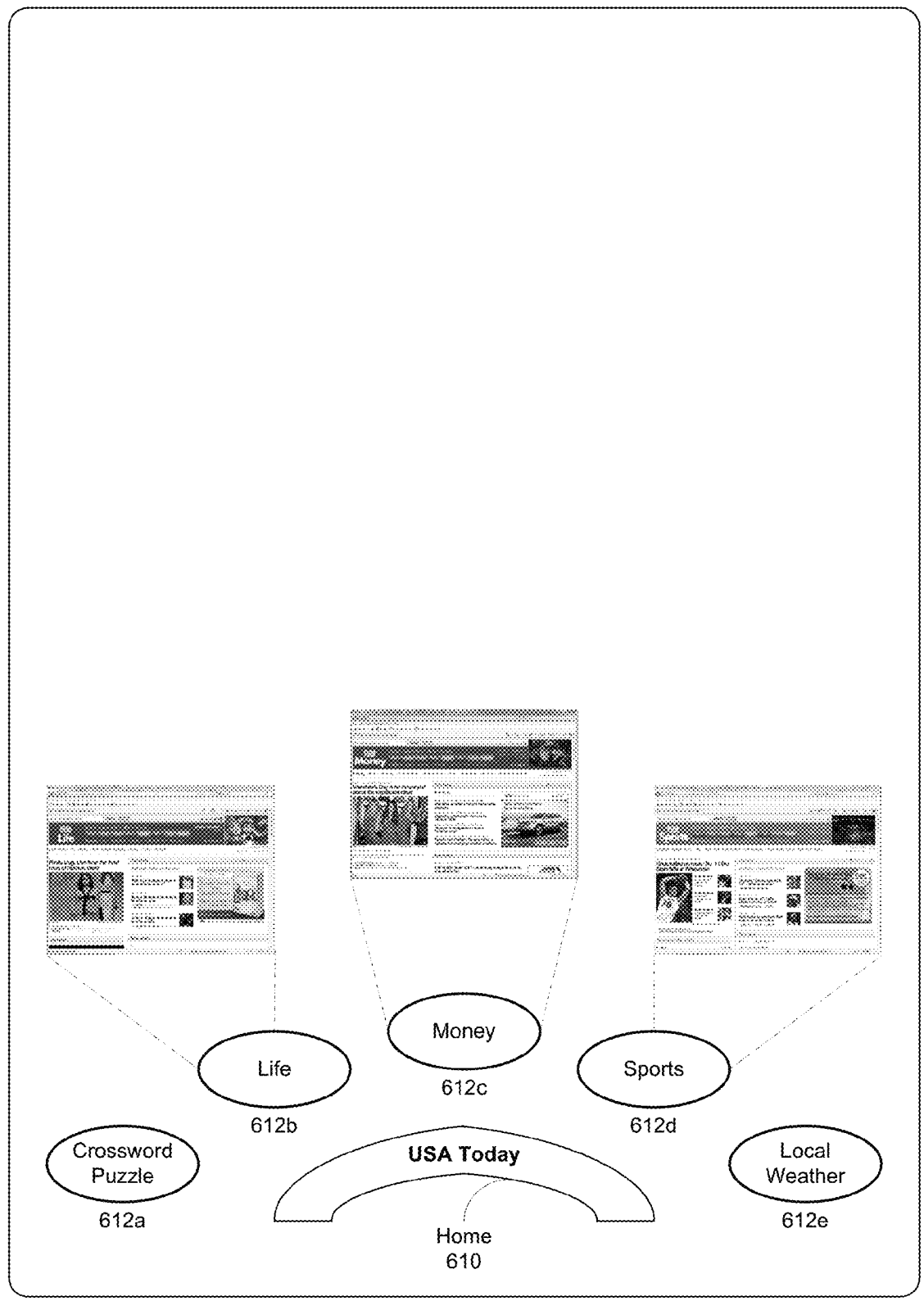
FIGS. 6A-B are views of a graphical user interface designed to provide information in association with a navigable display of nodes, according to some embodiments of the invention.
Figure 6B:
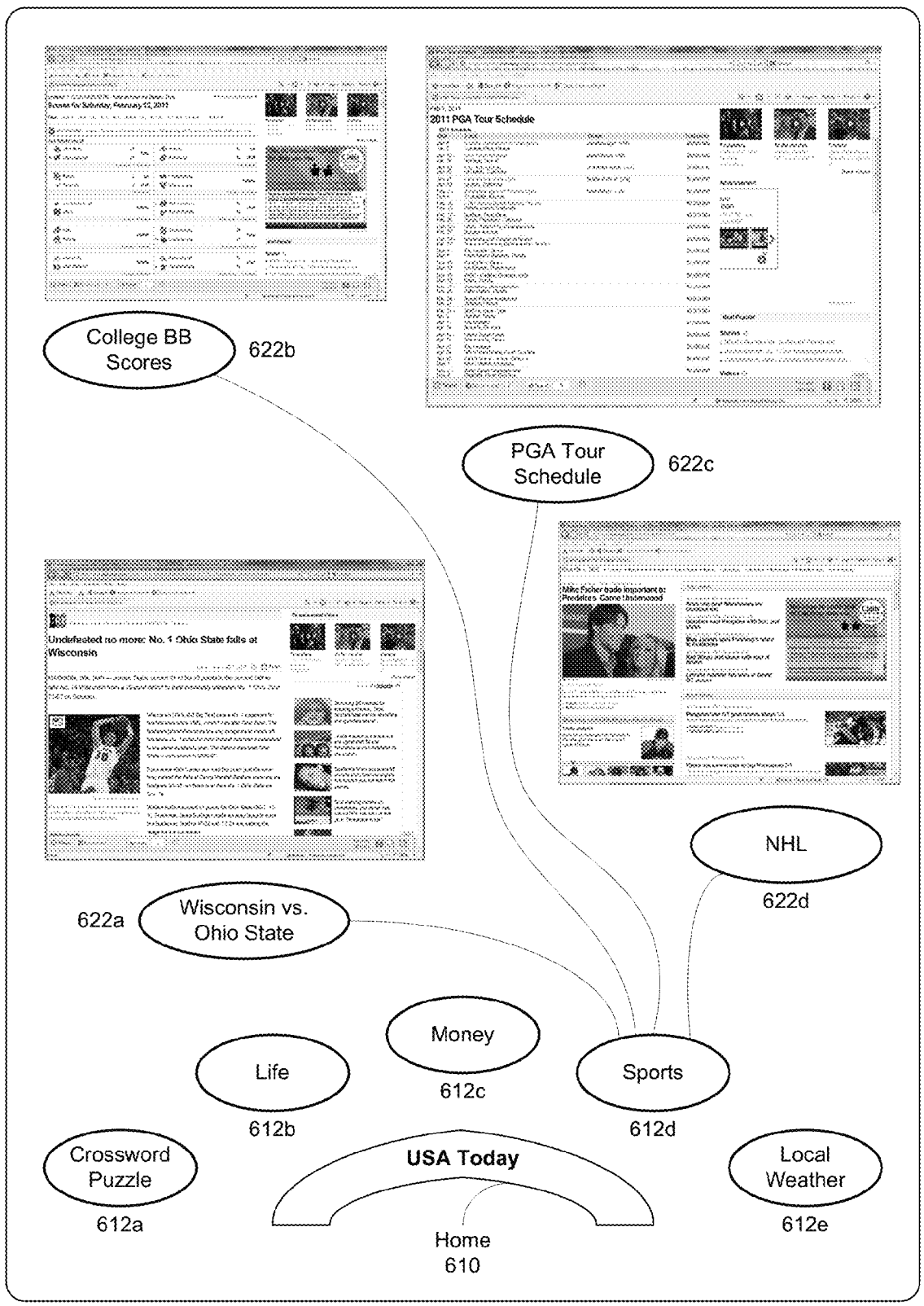

FIGS. 6A-B are views of a GUI designed to provide information in association with a navigable display of nodes, according to some embodiments of the invention. In these embodiments, a GUI view of a current cluster of nodes may cover much of display 602, as opposed to other embodiments designed to use as little space as possible.

The illustrative GUI view of FIG. 6A is configured to assist a user's browsing of news. Thus, current node home area 610 may represent a root of a newspaper or news website—in this example, USA Today®—and may include a representative logo, color scheme or other indication of its association.

The first cluster of nodes 612 may therefore correspond to different sections of the newspaper, such as Life 612b, Money 612c and Sports 612d. One or more nodes in the first cluster of nodes may correspond to end content items—such as Crossword Puzzle 612a and Weather 612e. As shown in FIG. 6A, any or all nodes may contain or be accompanied by thumb-nail images or text of the corresponding content—in this case, images of the first page in the corresponding section.

A later cluster of nodes—nodes reachable via nodes 612b, 612c, 612d—may be designed to provide a user with even more information without having to actually activate a node or open the corresponding story.

For example, FIG. 6B is a new view of the GUI provided after the user selects the Sports section (node 612d of FIG. 6A). In this view, a second cluster of nodes corresponds to stories of sporting events and/or sub-categories of sports news.

Thus, node 622a corresponds to a story regarding a college basketball game, perhaps for a favorite team identified by the user, or perhaps the headline story in the Sports section or in the college basketball subsection. Similarly, node 622b is accompanied by an image of college basketball scores, but also provides a mechanism to open the entire listing. Node 622c provides the PGA tour schedule, and 622d corresponds to a sub-category of sports news (i.e., the NHL). Illustratively, to open the corresponding content, the user may navigate to one of nodes 622 (e.g., via the displayed tracks) or to one of the thumb-nail pages displayed near nodes 622.

Nodes in a GUI may thus include or be accompanied by useful information drawn from (or even a summary of) corresponding content. A user may be able to identify subjects for whom such nodes should be constructed (e.g., favorite sports teams, favorite celebrities), or a user's favorite subjects may be identified over time from her browsing patterns.

Similar to the manner in which nodes may be magnified as they are approached, in order to make it easier to select one, a thumb-nail view of content corresponding to a node (e.g., nodes 612, 622) may expand in size as a user navigates toward or near the node, or at least the font size of any text within the thumb-nail may increase in order to make it more easily readable.

As described above, in some embodiments of the invention, a thumb-nail content view that accompanies a node portrays the actual content. In other embodiments, the thumb-nail view may portray a summary, translation, gist or other form of the actual content.

Implementations of embodiments of the invention described herein are virtually unlimited, and may be readily customized for general or specific datasets or types of content. Illustrative implementations, beyond those already described, include navigating a database or other collection of movies (or some other type of content), selecting contacts to whom an electronic mail note (or other message) will be transmitted, browsing a graph of a user's social network (e.g., on a social networking site), browsing content on the world-wide web, tracing a desired route on a map, browsing the news, etc.

Figure 7:
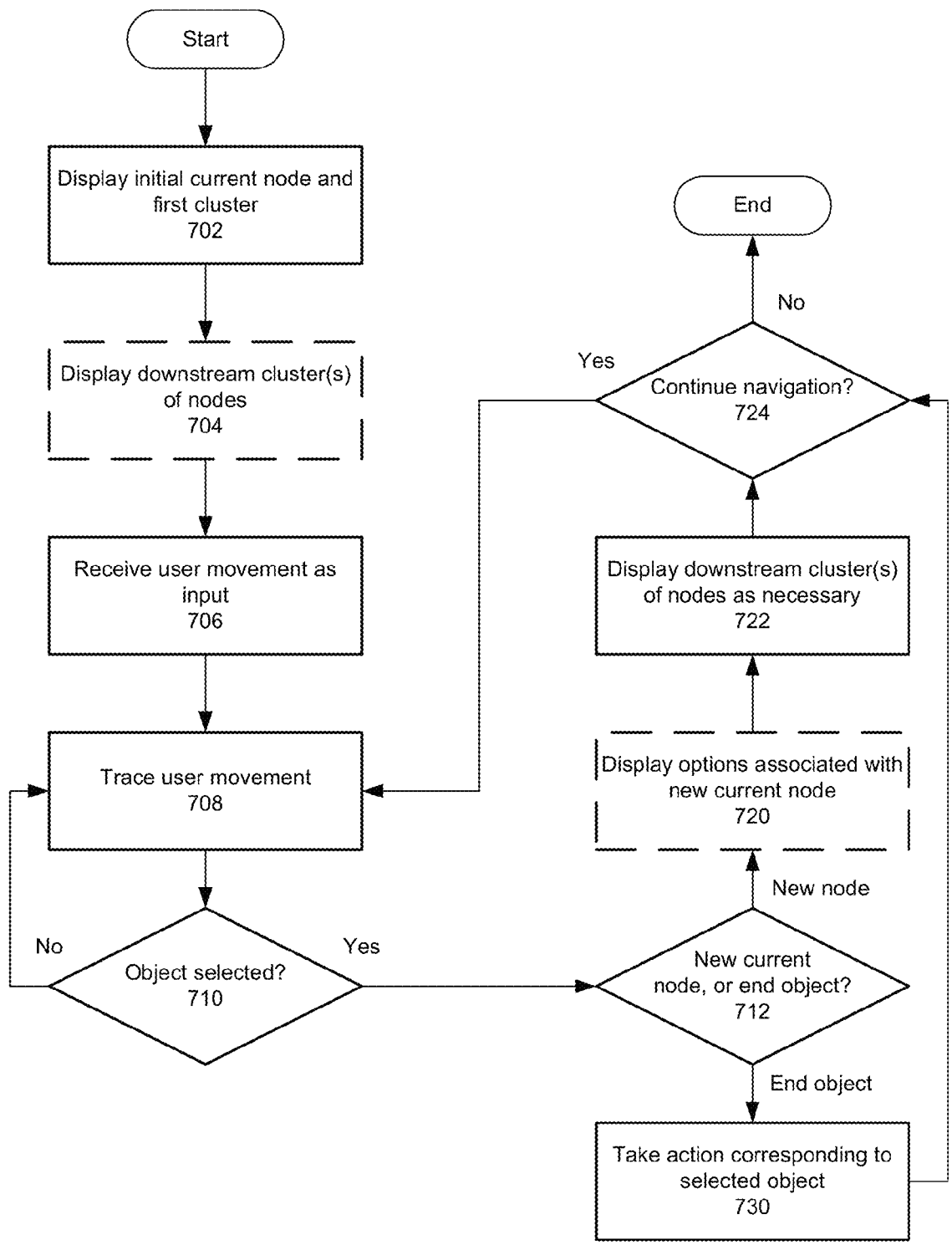
FIG. 7 is a flowchart illustrating one method of navigating among or to content, according to some embodiments of the invention.

FIG. 7 is a flowchart demonstrating a method of facilitating user navigation of electronic content with a Graphical User Interface (GUI) incorporating a touch-screen display, according to some embodiments of the invention. This method may start when a user places a finger on a touch-screen display of a device (e.g., a tablet, a smartphone) that has been directed to a particular website, or that is directed to such as site in response to the touch.

For example, the method may be performed or provided by a facilitator or other third-party, for the purpose of navigating a content provider's content (e.g., a newspaper, a musician), and the user may commence navigation by directing his browser to the facilitator's site, which may be configured to present content via a GUI described herein. Illustratively, he may visit a root page of a facilitator site, such as www.glydr.com, or a component of that site, such as www.glydr.com/usatoday (to navigate content of the current USA Today newspaper) or www.glydr.com/usatoday/sports (to navigate sports content of the USA Today newspaper).

In operation 702, an initial current node (e.g., a default starting area) and a first set or cluster of nodes relevant to that current node are displayed. These nodes may depend on how the GUI is activated or initiated. For example, the GUI may be opened for a particular task (e.g., make a call, browse the news, buy something online) by activating a corresponding control or button on the user's device that incorporates the GUI and touch-screen display.

In optional operation 704, one or more downstream clusters of nodes may be presented, in addition to the first cluster, before or while the user starts navigating the GUI.

In operation 706, the user's finger movement (gliding) along the surface of the touch-screen display is received as location input. Other input methods or implements may be used as described previously, such as voice, a tool, movement of the device (e.g., tilting, jerking), etc.

In operation 708, movement of the user's finger or tool is traced or followed. Illustratively, a current navigation location may be marked with a pointer, cursor or other object, but if the user employs a finger to navigate, the pointer may be obscured. If, however, navigation is performed with a tool that touches the screen (e.g., a wand) or that controls a pointer (e.g., a mouse, a touchpad), or by audio input or by movement of the device, the pointer may be visible.

Accurate capture of the user's navigation position may be needed to properly apply magnification or some other disambiguation aid, to determine whether additional nodes should be displayed (e.g., if the user navigates past all nodes in a current cluster, a downstream cluster may then be presented), to determine if the user is navigating backwards (e.g., toward a root or home area), and/or for other purposes.

In operation 710, the GUI determines whether an object has been selected. An object may be selected by contacting it with the user's gliding finger, with a different finger, by audio input (e.g., speaking a label or name of the object), activating a control of the device, and/or in other ways. In particular, if commit points are employed, when the user's finger contacts a commit point, the corresponding node may be selected automatically.

If an object is selected (whether explicitly or implicitly), the illustrated method continues at operation 712. Otherwise, the method returns to operation 708 to continue tracing or tracking user movement.

In operation 712, the GUI determines which type of object has been selected—typically either a new node (e.g., a node within a cluster of nodes relating to the current node) or some other object (e.g., an action spot or action node, a notice, a discrete content item). If the selected object is a navigation node, the method continues at operation 720; if the selected object is another type of object, the method advances to operation 730.

In optional operation 720, one or more actuable options associated with the new current node may be presented. For example, if the new node is an end node representing a content item (e.g., a song, a contact, a news story), the options may comprise different actions (e.g., play, read, edit, call, delete, open). If the new current node is an action (e.g., place a call, write a message), the options may be filters (e.g., redial, open recent calls, reply to previous message). It will be understood that any such options associated with a node may be presented as another cluster of nodes instead of a menu or list of actuable options.

In operation 722, one or more downstream clusters of nodes may be presented. For example, and as described immediately above, a final cluster of nodes may be presented to provide the user with options regarding the current node. Or, a new cluster of nodes related to the current node may be presented as the next level of navigation if they were not already presented before the new current node was selected (e.g., in operation 704).

In operation 724, the GUI determines whether navigation continues. Illustratively, if the user continues gliding or, conversely, if he does not activate a final action that would cause the GUI to close so that the device can be used for something else (e.g., place a call, open a web page), then it may be assumed that navigation is to continue, and the method returns to operation 708. However, if navigation is complete, because the user has reached the content and/or performed a desired action, for example, the method may end.

In operation 730, the GUI activates the selected object. This may entail opening a web page, refreshing/scrolling/reorienting the screen, pausing navigation, presenting a notice or notification, playing a song, etc. After operation 730, the method returns to operation 724.

The illustrated flowchart is not intended to cover all possible embodiments and implementations of the current invention, but rather describe GUI operation that may be common to different embodiments of the invention.

Figure 9:
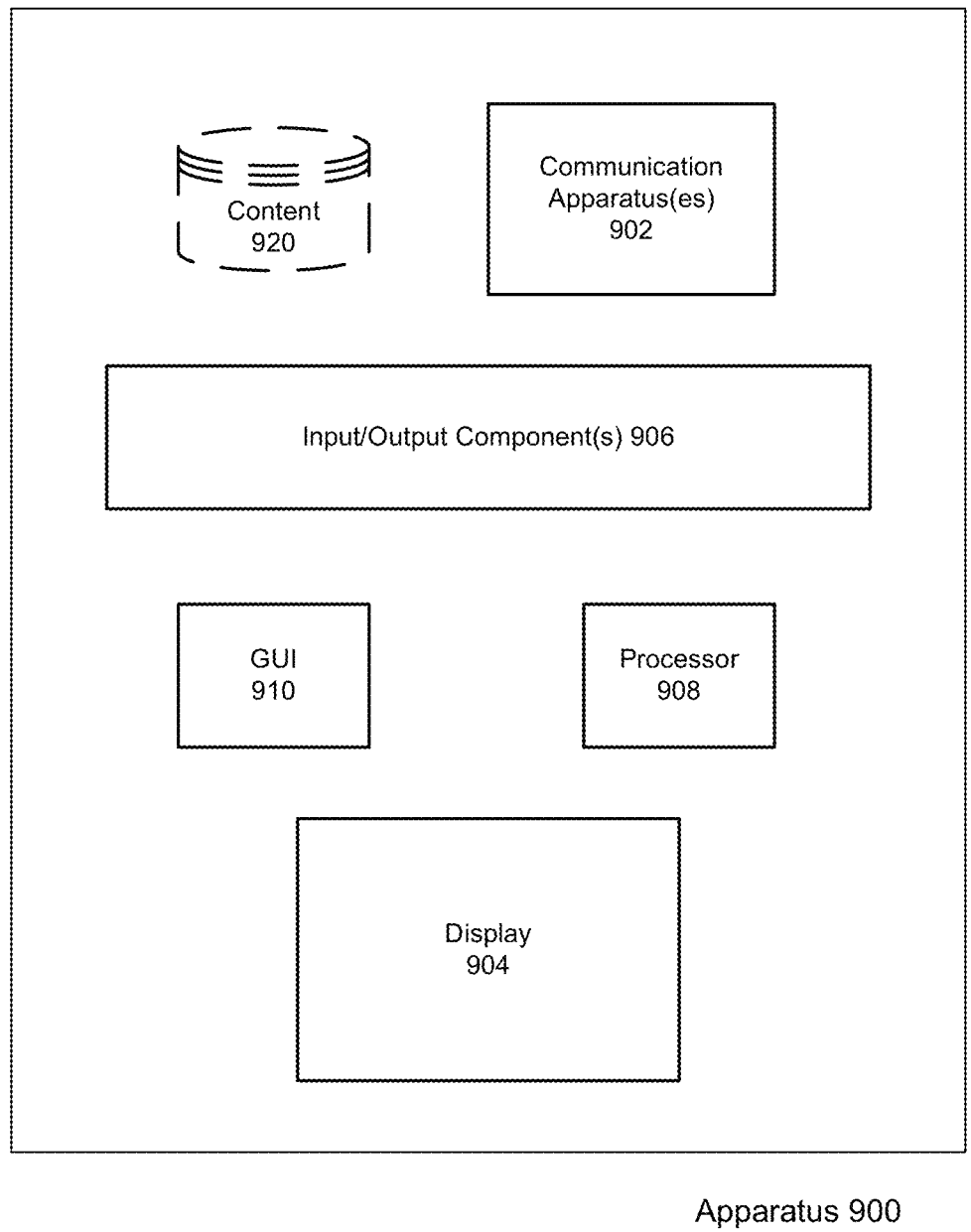
FIG. 9 is a block diagram of hardware apparatus that may be employed to facilitate navigation of content, according to some embodiments of the invention.

FIG. 9 is a block diagram of hardware apparatus that may be employed to facilitate navigation of content, according to some embodiments of the invention.

Apparatus 900 of FIG. 9 comprises communication apparatus(es) 902 for communicating with a wireless telephone network, a data network, external input/output devices and/or other entities. The apparatuses therefore send and/or receive voice and/or data communications. Any or all of these communication apparatuses may be combined or divided in other embodiments of the invention.

Apparatus 900 further comprises display 904, which may be a touch-screen display. Display 904 presents a graphical user interface described herein, for manipulation by a user of apparatus 900.

Input/output components 906 may include a keypad, keyboard, microphone, speaker, buttons, data storage and so on, as may be found on a mobile computing or communication device.

Apparatus 900 comprises processor 908 for operating the apparatus and executing program code designed to exercise functionality of the apparatus, such as displaying content, making telephone calls, taking pictures, etc. In particular, processor 908 is configured to operate GUI 910 to facilitate a user's navigation of content. Graphical user interface 910 may comprise a set of preferences configured by a user to affect operation of the GUI.

Optional content store 920 comprises content that the user may navigate and manipulate in addition to, or instead of, external content that is received via communication apparatuses 902.

Figure 10:
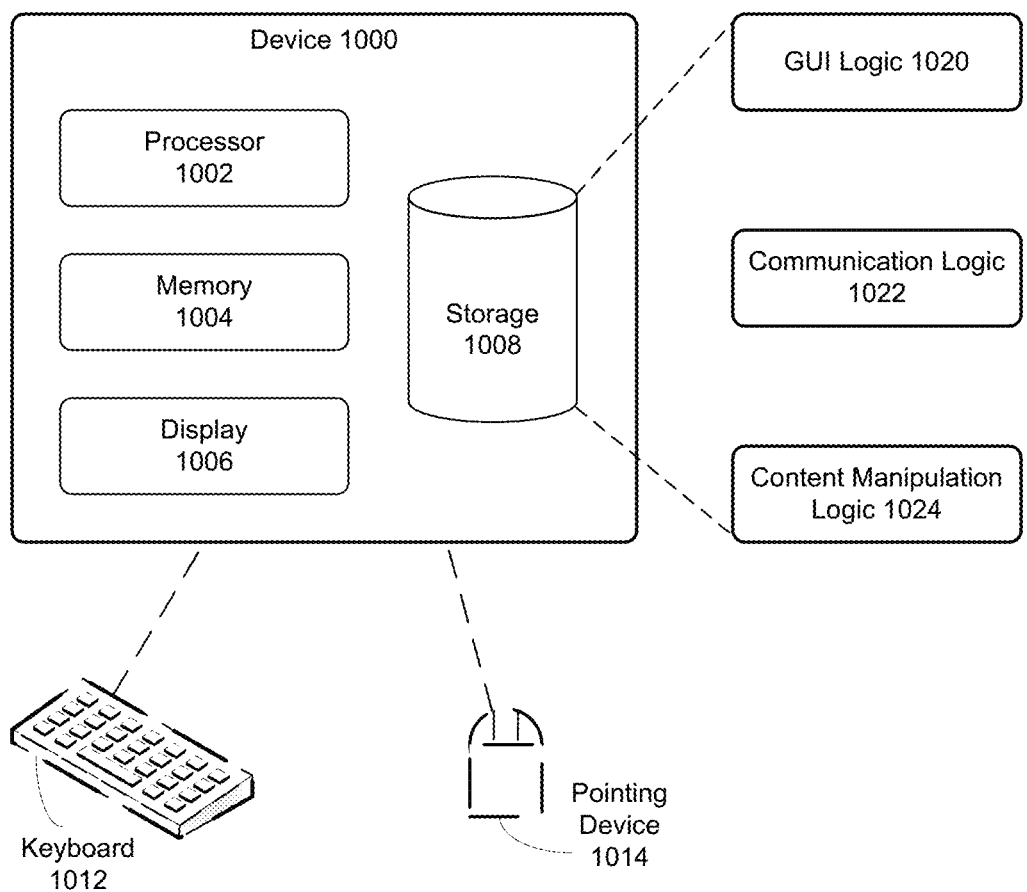
FIG. 10 is a block diagram of a device that may be employed to promote navigation of content by a user, according to some embodiments of the invention.

FIG. 10 is a block diagram of a device that may be employed to promote navigation of content by a user, according to some embodiments of the invention.

Device 1000 of FIG. 10 comprises processor 1002, memory 1004, display 1006 and storage 1008, which may comprise one or more optical and/or magnetic storage components. Device 1000 may be coupled (permanently or transiently) to keyboard 1012 and pointing device 1014.

Storage 1008 of the device stores logic that may be loaded into memory 1004 for execution by processor 1002. Such logic includes GUI logic 1020, communication logic 1022 and content manipulation logic 1024.

GUI logic 1020 comprises processor-executable instructions for configuring, presenting and manipulating a graphical user interface, such as one described herein. The GUI enables a user to navigate through/to content by gliding a finger or other tool along the surface of a touch-screen display.

Communication logic 1022 comprises processor-executable instructions for creating, transmitting, receiving and/or manipulating a communication. The communication may comprise a telephone call, a message (e.g., an electronic mail message, an SMS message), a web page, a song or other content or data.

Content manipulation logic 1024 comprises processor-executable instructions for manipulating content of any type (e.g., audio, video, text, multimedia). Logic 1024 may comprise a program for opening, editing, playing or otherwise handling the content.

The environment in which a present embodiment of the invention is executed may incorporate a general-purpose computer or a special-purpose device such as a hand-held computer. Details of such devices (e.g., processor, memory, data storage, display) may be omitted for the sake of clarity.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules may include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A method of facilitating a user's navigation of electronic content via a touch-screen display, the method comprising:
    displaying a first cluster of nodes corresponding to content available for presentation to the user on the touch-screen display;
    presenting a control on the touch-screen display that, when actuated, toggles display of one or more of:
        commit points for one or more nodes displayed on the touch-screen display, including a first commit point associated with a first node in the first cluster of nodes; and
        for each commit point, a corresponding path that traverses the commit point, between a current node displayed on the touch-screen display and the node associated with the commit point;
    after selection of the first node, by the user, displaying a second cluster of nodes corresponding to content available for presentation to the user on the touch-screen display;
    tracking the user's navigation of the display through multiple clusters of nodes, including the first cluster of nodes and the second cluster of nodes;
    during said tracking, receiving multiple simultaneous inputs that affect the navigation; and
    opening content corresponding to a final node selected by the user.

2. The method of claim 1, further comprising in response to receiving the multiple inputs:
    scrolling the display in a direction of movement of a first tool touching the touch-screen display;
    wherein the multiple inputs are provided by the first tool and a second tool simultaneously touching the touch-screen display; and
    wherein the second tool remains stationary during the movement of the first tool.

3. The method of claim 2, further comprising:
    pausing the navigation of the display during said scrolling; and
    resuming the navigation of the display when the first tool is no longer touching the touch-screen display.

4. The method of claim 1, further comprising in response to receiving the multiple inputs:
    initiating an action corresponding to a second node displayed on the touch-screen display, regarding an entity corresponding to a third node displayed on the touch-screen display;
    wherein the second node is identified by one of the multiple inputs; and
    wherein the third node is identified by another of the multiple inputs.

5. The method of claim 4, wherein:
    the action corresponding to the second node is transmission of a communication; and
    the entity corresponding to the third node is a person known to the user.

6. The method of claim 1, wherein selection of the first node comprises touch-selecting the first commit point.

7. The method of claim 1, further comprising:
relocating the first node toward the location of the commit point when the user touch-selects the commit point.

8. The method of claim 1, further comprising:
in response to touch-selection by the user of the first commit point, without touching the first node:
removing from the display all nodes in the first cluster of nodes except the first node; and
displaying the second cluster of nodes separate from the first cluster of nodes.

9. A non-transitory computer-readable medium storing instructions that, when executed by a processor of an electronic device, cause the device to perform a method of facilitating a user's navigation of electronic content via a touch-screen display of the device, the method comprising:
displaying a first cluster of nodes corresponding to content available for presentation to the user on the touch-screen display;
presenting a control on the touch-screen display that, when actuated, toggles display of one or more of:
commit points for one or more nodes displayed on the touch-screen display, including a first commit point associated with a first node in the first cluster of nodes; and
for each commit point, a corresponding path that traverses the commit point, between a current node displayed on the touch-screen display and the node associated with the commit point;
after selection of the first node, by the user, displaying a second cluster of nodes corresponding to content available for presentation to the user on the touch-screen display;
tracking the user's navigation of the display through multiple clusters of nodes, including the first cluster of nodes and the second cluster of nodes;
during said tracking, receiving multiple simultaneous inputs that affect the navigation; and
opening content corresponding to a final node selected by the user.

10. The non-transitory computer-readable medium of claim 9, wherein the method further comprises, in response to receiving the multiple inputs:
scrolling the display in a direction of movement of a first tool touching the touch-screen display;
wherein the multiple inputs are provided by the first tool and a second tool simultaneously touching the touch-screen display; and
wherein the second tool remains stationary during the movement of the first tool.

11. The non-transitory computer-readable medium of claim 10, wherein the method further comprises:
pausing the navigation of the display during said scrolling; and
resuming the navigation of the display when the first tool is no longer touching the touch-screen display.

12. The non-transitory computer-readable medium of claim 9, wherein the method further comprises, in response to receiving the multiple inputs:
initiating an action corresponding to a second node displayed on the touch-screen display, regarding an entity corresponding to a third node displayed on the touch-screen display;
wherein the second node is identified by one of the multiple inputs; and
wherein the third node is identified by another of the multiple inputs.

13. The non-transitory computer-readable medium of claim 12, wherein:
the action corresponding to the second node is transmission of a communication; and
the entity corresponding to the third node is a person known to the user.

14. The non-transitory computer-readable medium of claim 9, wherein the method further comprises:
in response to touch-selection by the user of the first commit point, without touching the first node:
removing from the display all nodes in the first cluster of nodes except the first node; and
displaying the second cluster of nodes separate from the first cluster of nodes.

15. The non-transitory computer-readable medium of claim 9, wherein selection of the first node comprises touch-selecting the first commit point.

16. The non-transitory computer-readable medium of claim 9, wherein the method further comprises:
relocating the first node toward the location of the commit point when the user touch-selects the commit point.

17. An apparatus for facilitating a user's navigation of electronic content via a touch-screen display, the apparatus comprising:
the touch-screen display;
at least one processor; and
memory storing instructions that, when executed by the at least one processor, cause the apparatus to:
display a first cluster of nodes corresponding to content available for presentation to the user on the touch-screen display;
present a control on the touch-screen display that, when actuated, toggles display of one or more of:
commit points for one or more nodes displayed on the touch-screen display, including a first commit point associated with a first node in the first cluster of nodes; and
for each commit point, a corresponding path that traverses the commit point, between a current node displayed on the touch-screen display and the node associated with the commit point;
after selection of the first node, by the user, display a second cluster of nodes corresponding to content available for presentation to the user on the touch-screen display;
track the user's navigation of the display through multiple clusters of nodes, including the first cluster of nodes and the second cluster of nodes;
during said tracking, receive multiple simultaneous inputs that affect the navigation; and
open content corresponding to a final node selected by the user.

18. The apparatus of claim 17, wherein the memory further stores instructions that, when executed by the at least one processor, cause the apparatus to, in response to receiving the multiple inputs:
scroll the display in a direction of movement of a first tool touching the touch-screen display;
wherein the multiple inputs are provided by the first tool and a second tool simultaneously touching the touch-screen display; and wherein the second tool remains stationary during the movement of the first tool.

19. The apparatus of claim 18, wherein the memory further stores instructions that, when executed by the at least one processor, cause the apparatus to:
   pause the navigation of the display during said scrolling; and
   resume the navigation of the display when the first tool is no longer touching the touch-screen display.

20. The apparatus of claim 17, wherein the memory further stores instructions that, when executed by the at least one processor, cause the apparatus to, in response to receiving the multiple inputs:
   initiate an action corresponding to a second node displayed on the touch-screen display, regarding an entity corresponding to a third node displayed on the touch-screen display;
   wherein the second node is identified by one of the multiple inputs; and
   wherein the third node is identified by another of the multiple inputs.

21. The apparatus of claim 20, wherein:
   the action corresponding to the second node is transmission of a communication; and
   the entity corresponding to the third node is a person known to the user.

22. The apparatus of claim 17, wherein selection of the first node comprises touch-selecting the first commit point.

23. The apparatus of claim 17, wherein the memory further stores instructions that, when executed by the at least one processor, cause the apparatus to:
   relocate the first node toward the location of the commit point when the user touch-selects the commit point.

24. The apparatus of claim 17, wherein the memory further stores instructions that, when executed by the at least one processor, cause the apparatus to:
   in response to touch-selection by the user of first commit point, without touching the first node:
      remove from the display all nodes in the first cluster of nodes except the first node; and
      display the second cluster of nodes separate from the first cluster of nodes.

* * * * *